US011347126B2

(12) United States Patent
Saeki et al.

(10) Patent No.: US 11,347,126 B2
(45) Date of Patent: May 31, 2022

(54) OPTICAL MODULE AND PROCESS OF ASSEMBLING THE SAME

(71) Applicant: Sumitomo Electric Industries, Ltd., Osaka (JP)

(72) Inventors: Tomoya Saeki, Osaka (JP); Yasushi Fujimura, Osaka (JP); Toru Watanabe, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 34 days.

(21) Appl. No.: 16/957,920

(22) PCT Filed: Dec. 26, 2018

(86) PCT No.: PCT/JP2018/047950
§ 371 (c)(1),
(2) Date: Jun. 25, 2020

(87) PCT Pub. No.: WO2019/131804
PCT Pub. Date: Jul. 4, 2019

(65) Prior Publication Data
US 2021/0055623 A1 Feb. 25, 2021

(30) Foreign Application Priority Data
Dec. 26, 2017 (JP) .............................. JP2017-249023

(51) Int. Cl.
*G02F 1/225* (2006.01)
*G02B 6/30* (2006.01)
(Continued)

(52) U.S. Cl.
CPC ............. *G02F 1/2257* (2013.01); *G02B 6/30* (2013.01); *G02B 6/4206* (2013.01);
(Continued)

(58) Field of Classification Search
CPC ...... G02B 6/30; G02B 6/4206; G02B 6/4225; G02B 6/4246; G02F 1/015; G02F 1/025; G02F 1/225; G02F 1/2257
See application file for complete search history.

(56) References Cited

U.S. PATENT DOCUMENTS 5,787,215 A * 7/1998 Kuhara .................. H01L 31/12
257/E31.095
6,043,550 A * 3/2000 Kuhara ............. H01L 31/02162
257/233
(Continued)

FOREIGN PATENT DOCUMENTS

JP 2009-229592 A 10/2009
JP 2017-026988 A 2/2017
(Continued)

OTHER PUBLICATIONS

Schiappelli et al., Efficient fiber-to-waveguide coupling by a lens on the end of the optical fiber fabricated by focused ion beam milling, Microelectronic Engineering, V 73-74, 2004 (Year: 2004).*

*Primary Examiner* — Peter Radkowski
(74) *Attorney, Agent, or Firm* — Baker Botts L.L.P.; Michael A. Sartori

(57) ABSTRACT

An optical module that provides a semiconductor modulator, an input lens system and first and second output lens systems, and two monitor photodiodes is disclosed. The semiconductor modulator provides an input port, first and second output ports, and two monitor ports in one side thereof. The input port and the first and second output ports face the input lens system and the first and second lens systems, respectively. The two monitor ports face the two monitor photodiodes, respectively. The first and second output ports are symmetrically disposed with respect to the input port in the one side. The two monitor ports are disposed in respective outer sides of the first and second (Continued)

output ports and symmetrically with respect to the input port.

12 Claims, 14 Drawing Sheets

(51) Int. Cl.
*G02B 6/42* (2006.01)
*H04B 10/40* (2013.01)
*H04J 14/06* (2006.01)

(52) U.S. Cl.
CPC ........... *G02B 6/4225* (2013.01); *H04B 10/40* (2013.01); *H04J 14/06* (2013.01); *G02F 2203/07* (2013.01)

(56) References Cited

U.S. PATENT DOCUMENTS

| | | | | |
|---|---|---|---|---|
| 6,370,290 B1* | 4/2002 | Ball | | G02B 6/4201 385/14 |
| 6,766,082 B2 | 7/2004 | Hirabayashi | | G02B 6/4201 385/122 |
| 7,275,877 B2* | 10/2007 | Go | | G02B 6/4201 385/92 |
| 8,391,651 B2* | 3/2013 | Ichikawa | | G02B 6/125 385/1 |
| 8,396,334 B2* | 3/2013 | Ichikawa | | G02B 6/125 385/1 |
| 8,721,194 B2* | 5/2014 | Huang | | G02B 6/264 385/93 |
| 8,923,673 B2* | 12/2014 | Katou | | G02F 1/011 385/46 |
| 9,059,805 B2* | 6/2015 | Mak | | H04B 10/5055 |
| 9,366,832 B2* | 6/2016 | Arao | | G02B 6/43 |
| 9,448,457 B2* | 9/2016 | Itou | | H04B 10/5053 |
| 9,477,051 B2* | 10/2016 | Oki | | H04B 10/5561 |
| 9,490,900 B2* | 11/2016 | Saeki | | G02B 6/4257 |
| 9,780,882 B2* | 10/2017 | Saeki | | G02B 6/42 |
| 2004/0264888 A1* | 12/2004 | Go | | G02B 6/325 385/92 |
| 2005/0083568 A1* | 4/2005 | Nakae | | G02B 6/4204 359/341.3 |
| 2005/0128924 A1* | 6/2005 | Nakae | | G02B 6/4225 369/121 |
| 2007/0053625 A1* | 3/2007 | Ichioka | | |
| 2009/0116781 A1* | 5/2009 | Ichikawa | | G02B 6/4204 385/5 |
| 2009/0238512 A1 | 9/2009 | Sugiyama | | |
| 2012/0020607 A1* | 1/2012 | Ichikawa | | G02B 6/125 385/1 |
| 2012/0075637 A1* | 3/2012 | Sangawa | | G02F 1/11 356/477 |
| 2013/0051024 A1* | 2/2013 | Amit | | H04B 10/40 362/259 |
| 2013/0287406 A1* | 10/2013 | Huang | | G02B 6/264 398/139 |
| 2014/0023310 A1* | 1/2014 | Katou | | G02B 6/29352 385/3 |
| 2014/0308047 A1* | 10/2014 | Mak | | H04B 10/50577 398/182 |
| 2015/0042943 A1* | 2/2015 | Hatanaka | | G02B 5/3016 349/194 |
| 2015/0043071 A1* | 2/2015 | Hatanaka | | G02B 5/305 359/489.07 |
| 2015/0104177 A1* | 4/2015 | Kato | | G02B 6/4246 398/79 |
| 2015/0147018 A1* | 5/2015 | Itou | | H04B 10/5561 385/3 |
| 2015/0286016 A1* | 10/2015 | Arao | | G02B 6/43 385/79 |
| 2015/0326319 A1* | 11/2015 | Oki | | H04B 10/556 398/135 |
| 2015/0333833 A1* | 11/2015 | Saeki | | G02B 6/4257 398/79 |
| 2016/0028489 A1* | 1/2016 | Saeki | | G02B 6/4265 398/79 |
| 2016/0170146 A1* | 6/2016 | Kurokawa | | G02B 6/4257 385/14 |
| 2016/0344156 A1* | 11/2016 | Rothberg | | C12Q 1/6869 |
| 2017/0019181 A1 | 1/2017 | Flintham et al. | | |
| 2017/0033884 A1 | 2/2017 | Sugiyama et al. | | |
| 2017/0184802 A1 | 6/2017 | Saeki et al. | | |
| 2017/0227724 A1* | 8/2017 | Yamaji | | H04B 10/505 |
| 2017/0242316 A1 | 8/2017 | Horiguchi et al. | | |

FOREIGN PATENT DOCUMENTS

| | | | | |
|---|---|---|---|---|
| WO | WO-2016067617 A2 * | 5/2016 | ......... | H01S 5/02216 |
| WO | 2017/085447 A1 | 5/2017 | | |

* cited by examiner

[Fig. 1]
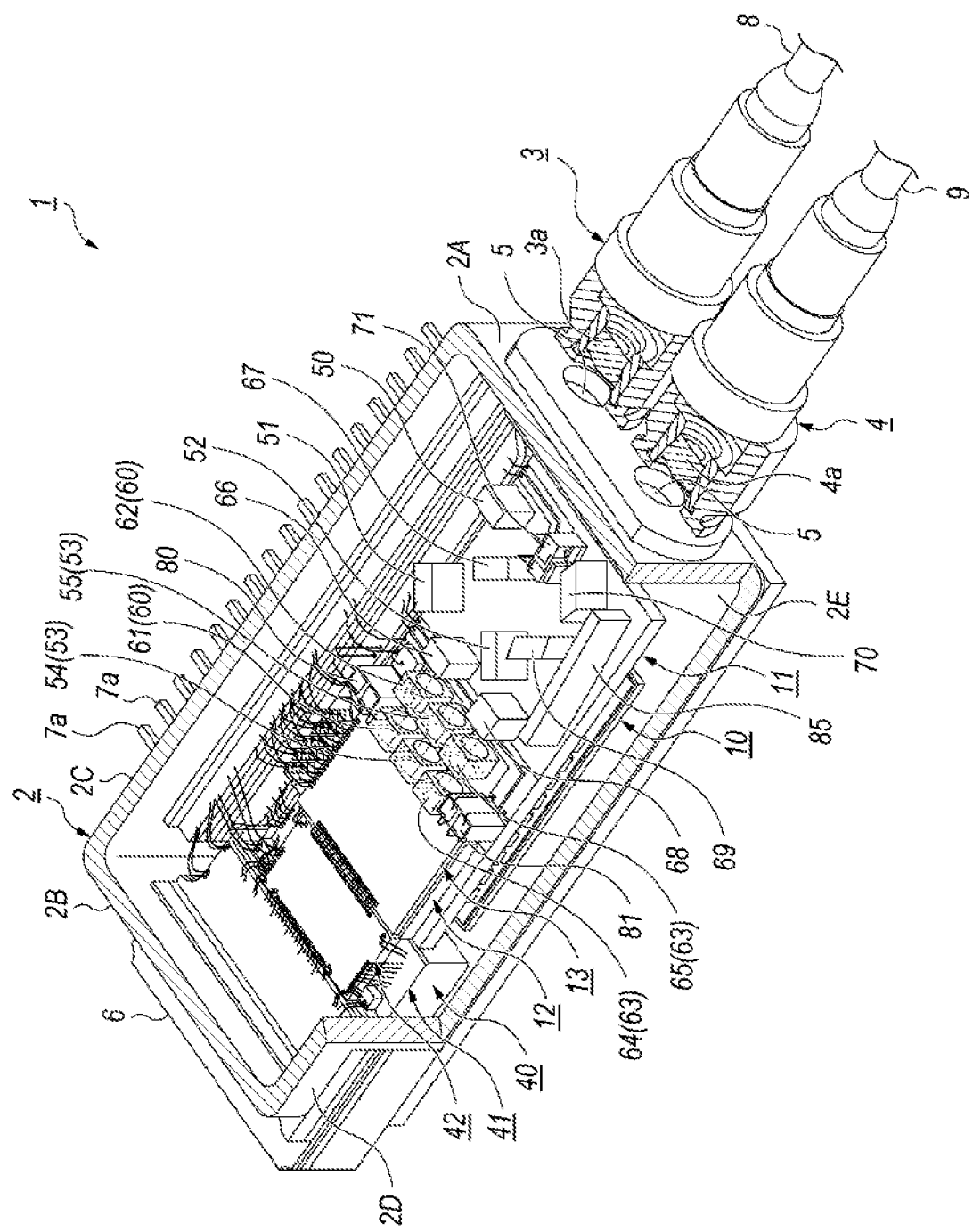

[Fig. 2]
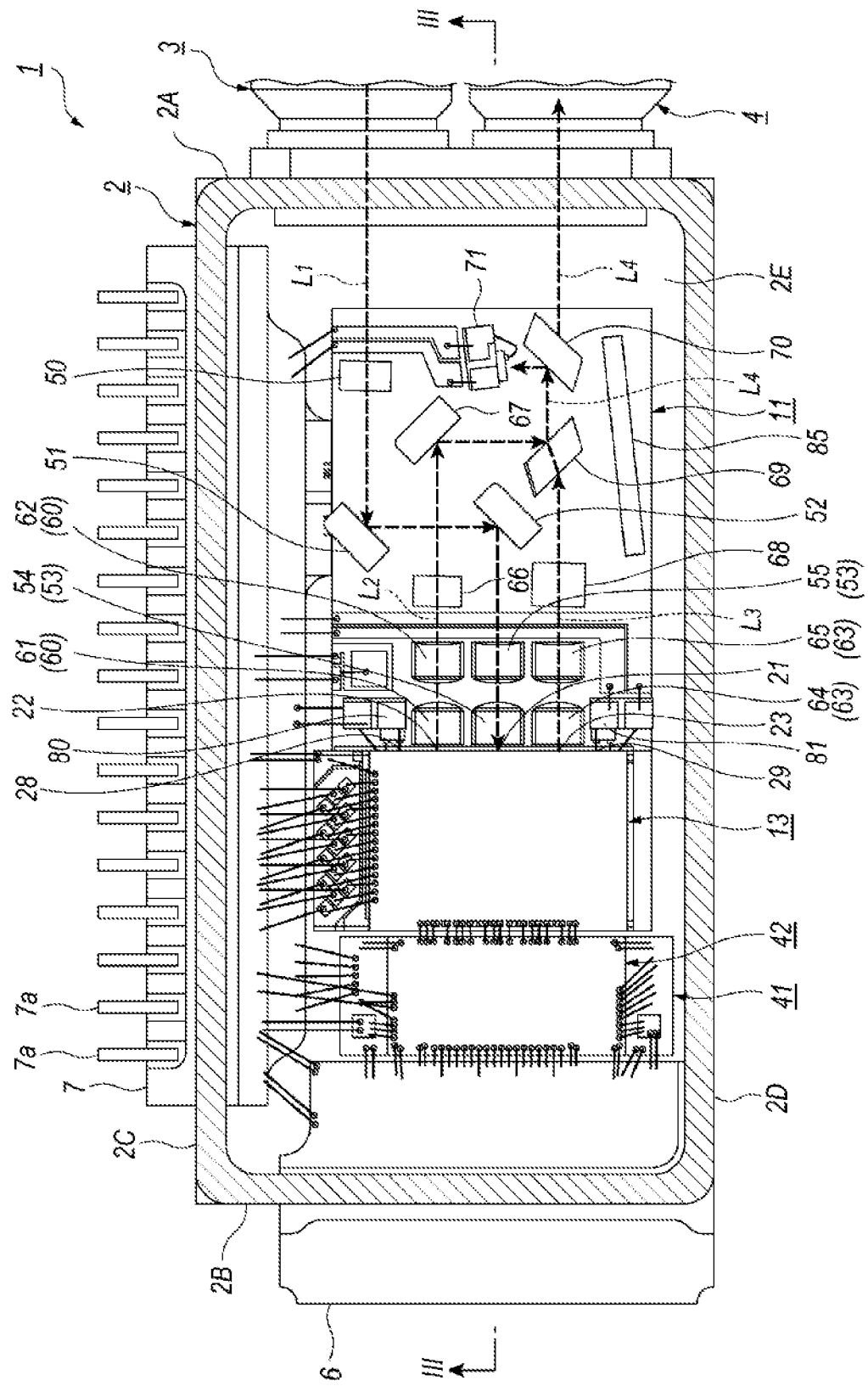

[Fig. 3]
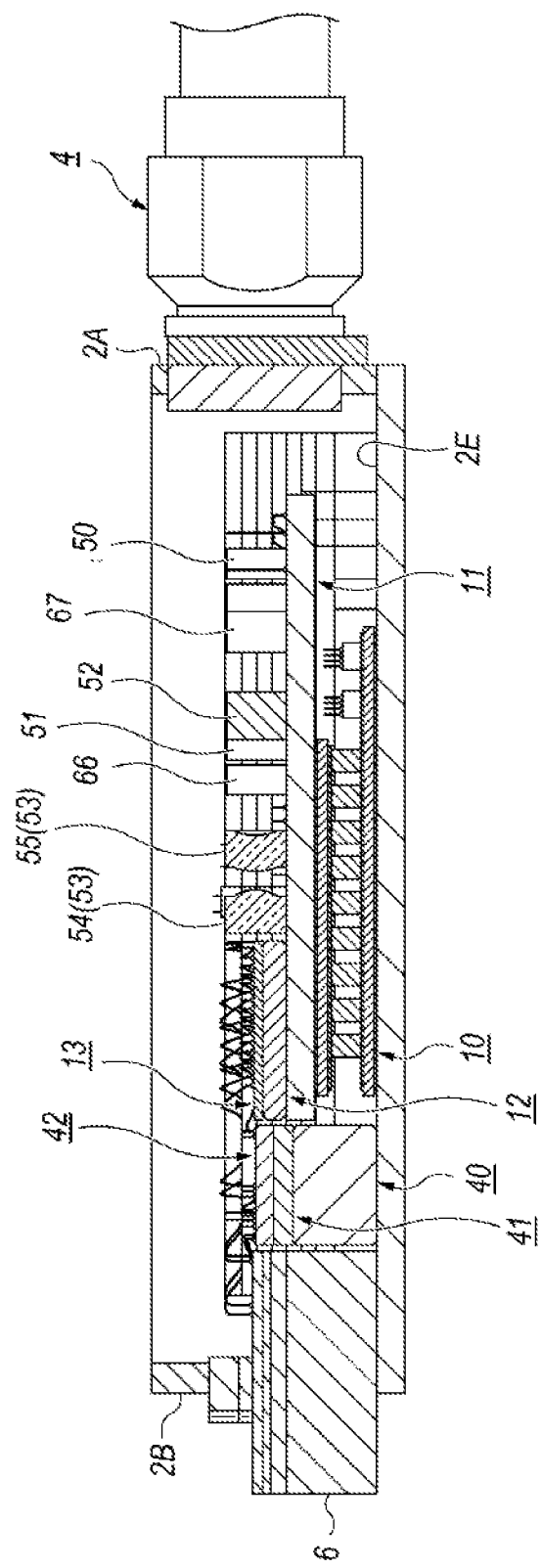

[Fig. 4]
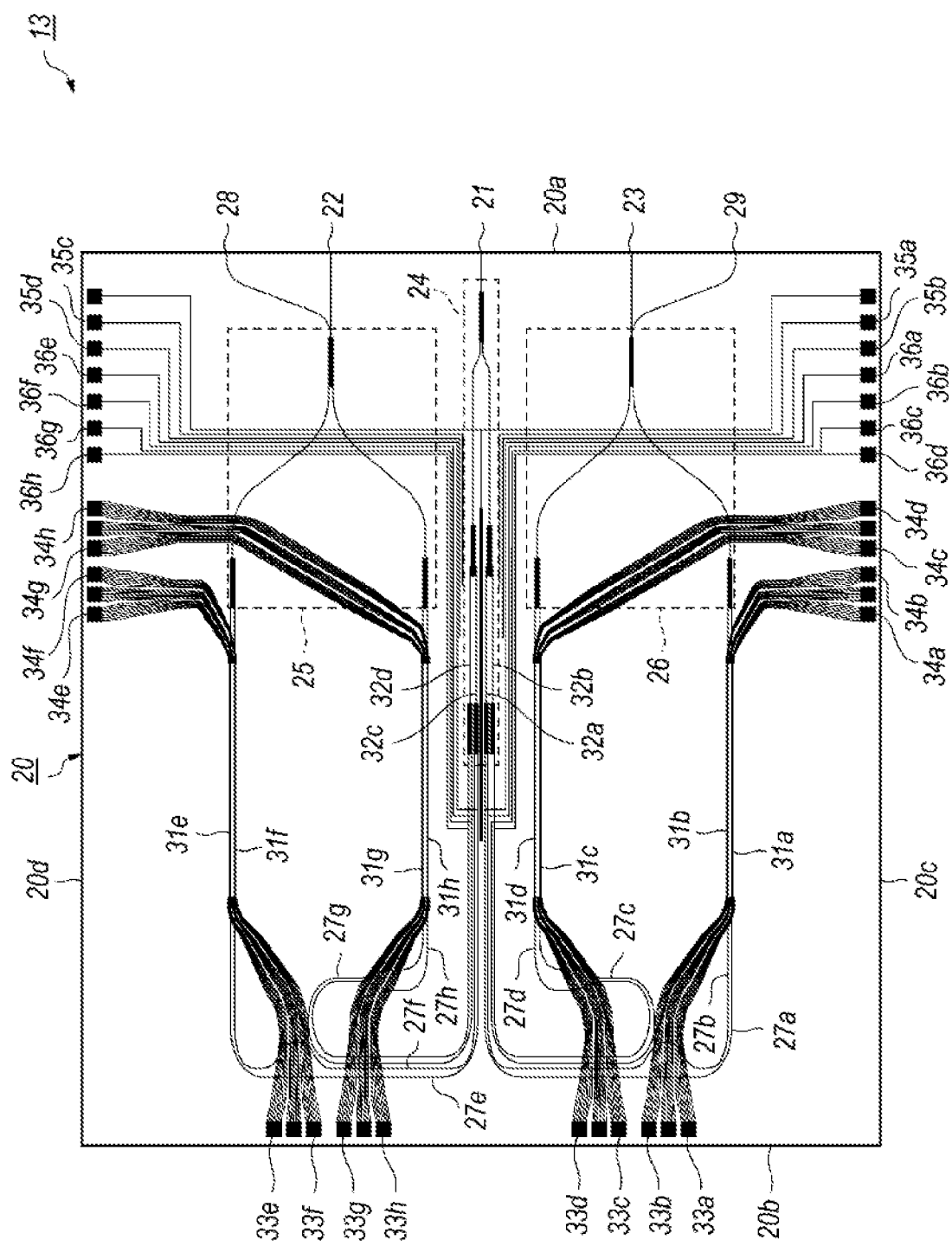

[Fig. 5]
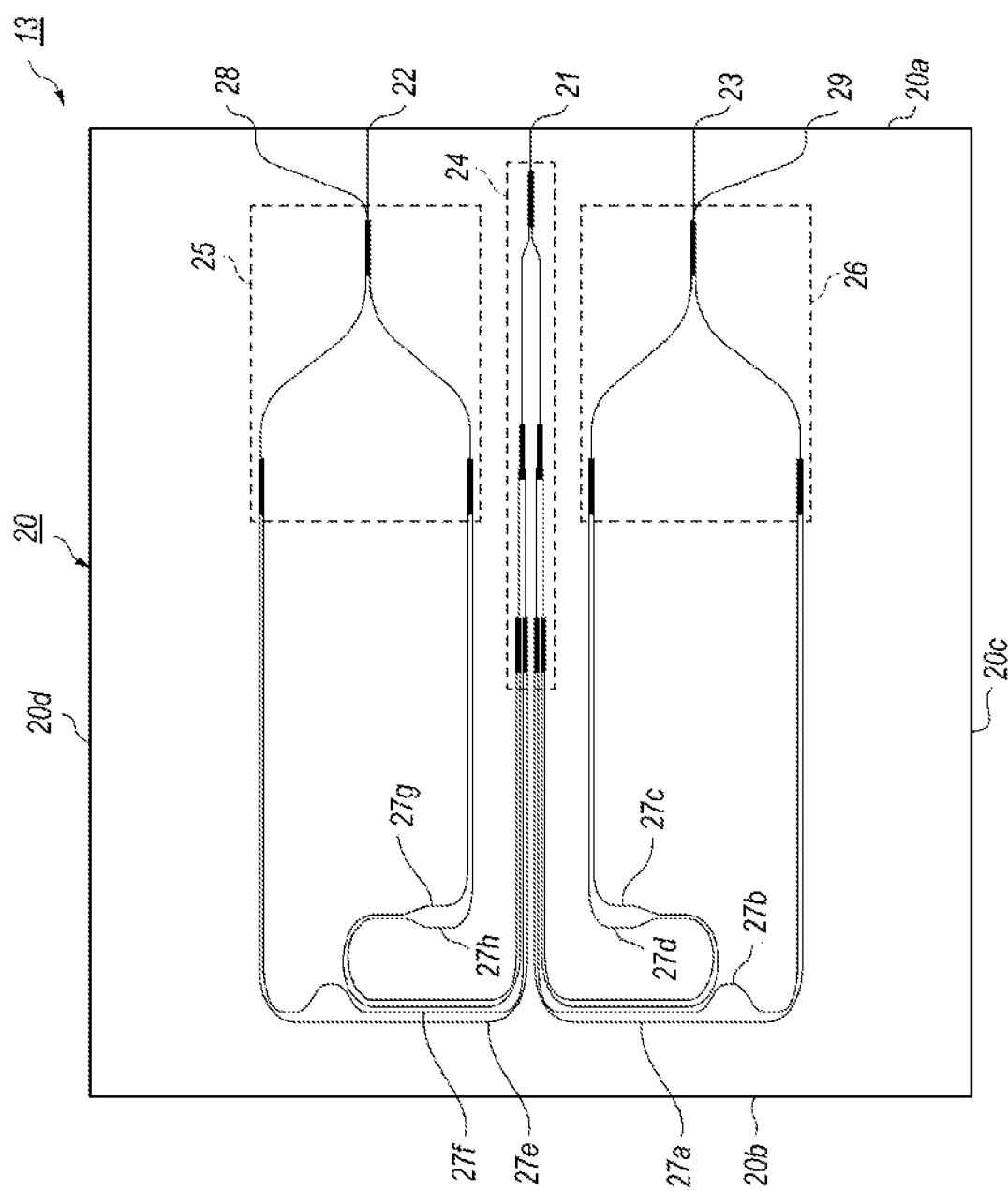

[Fig. 6]
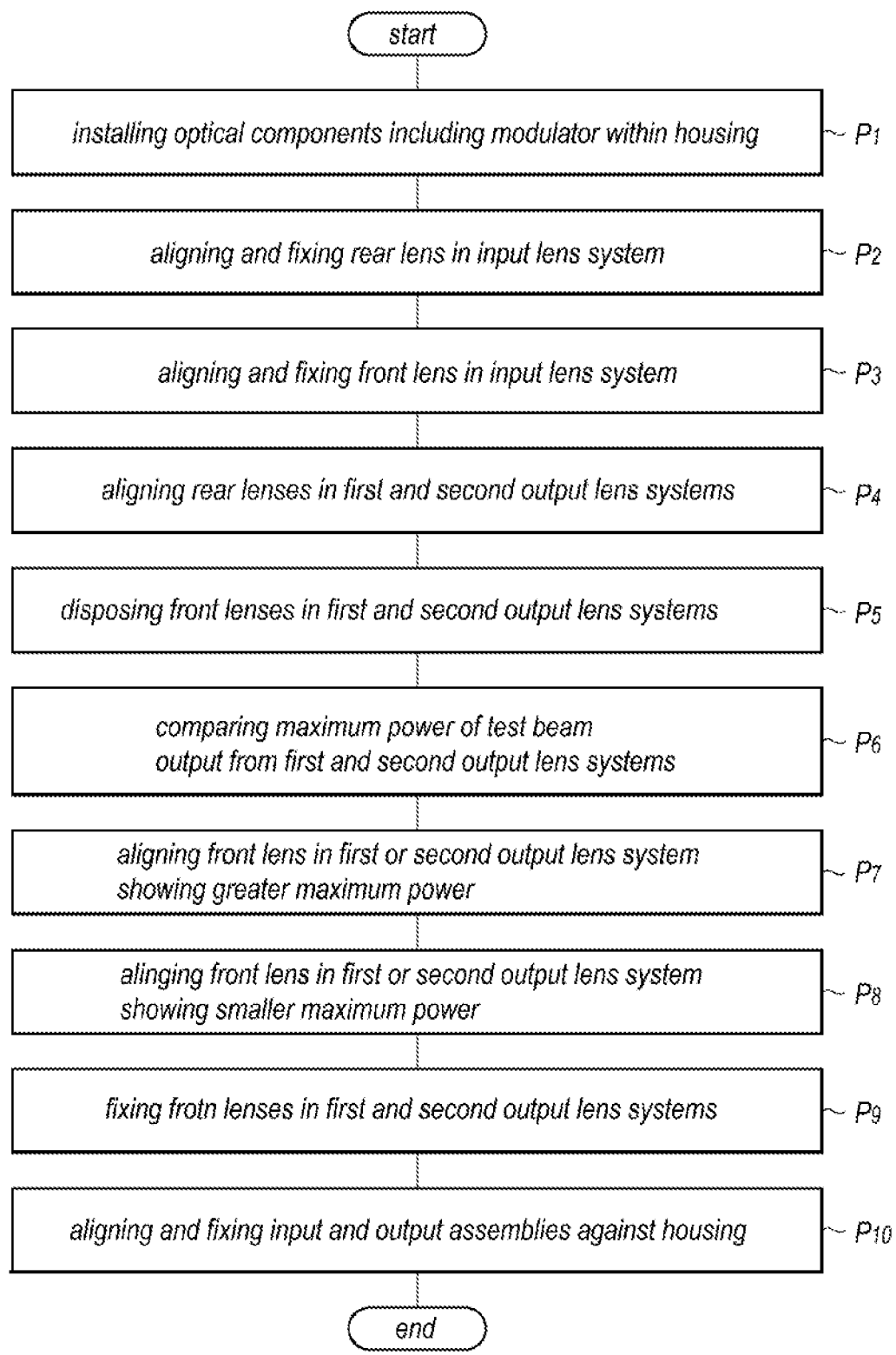

[Fig. 7]
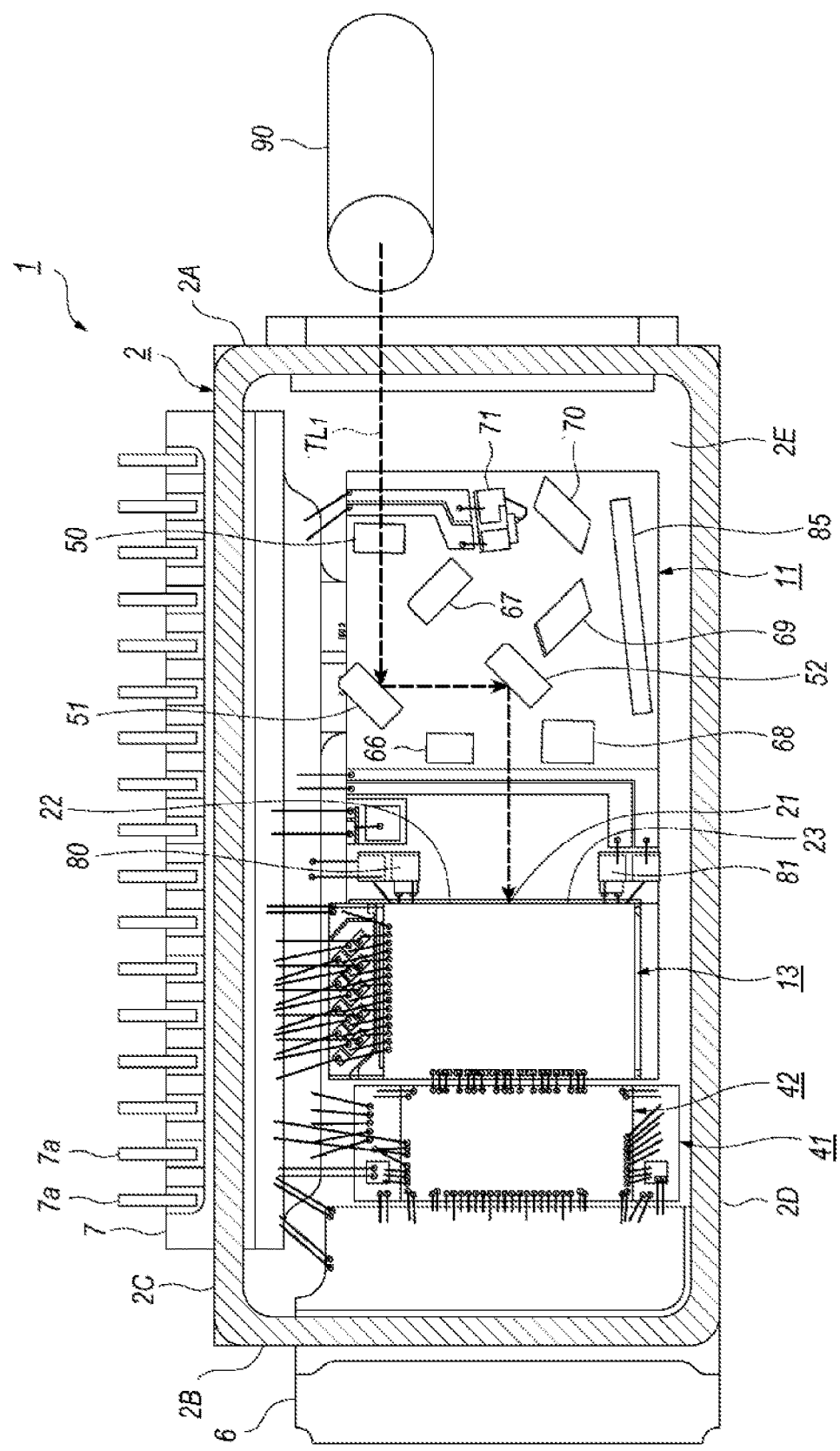

[Fig. 8]
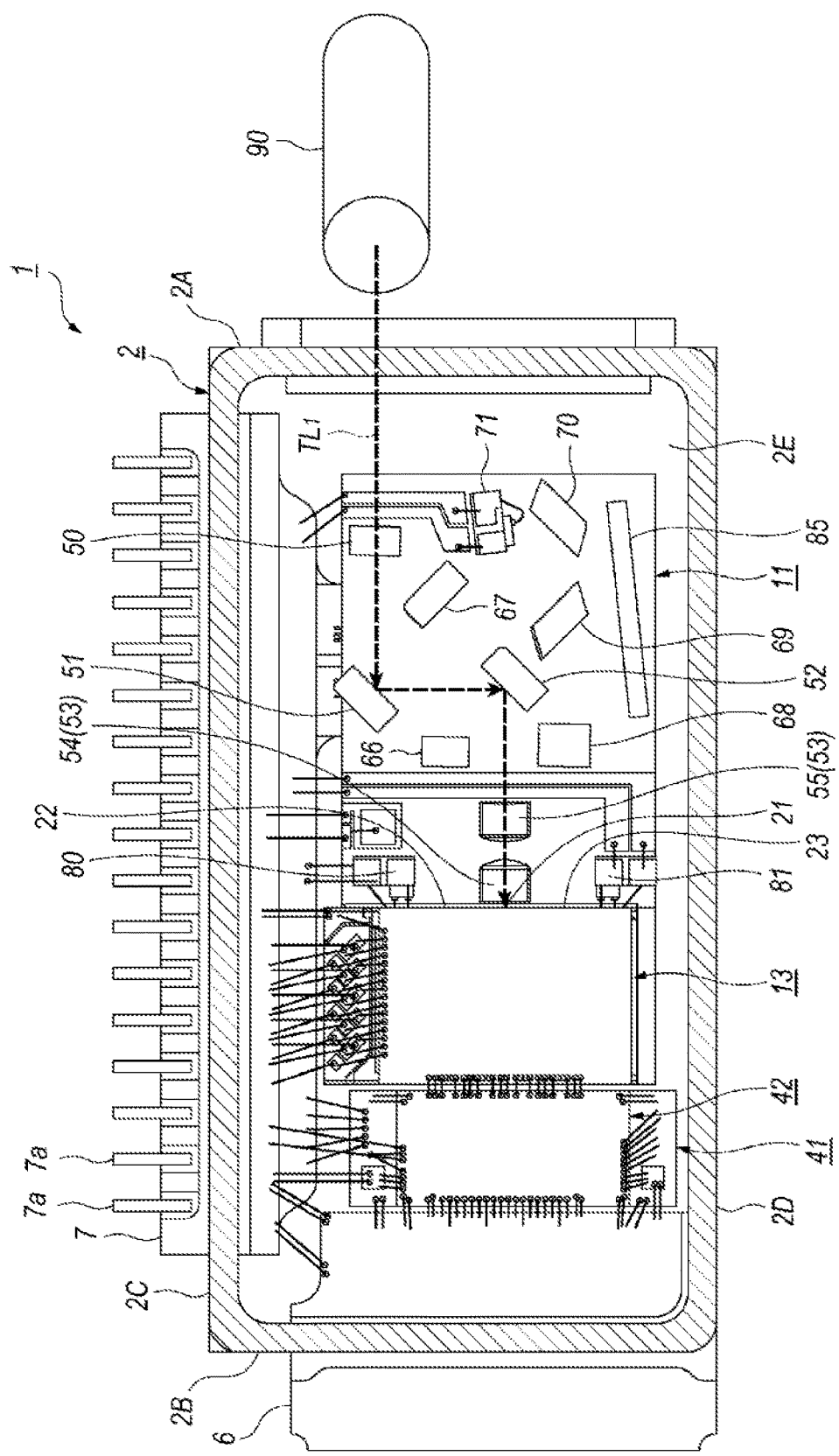

[Fig. 9]
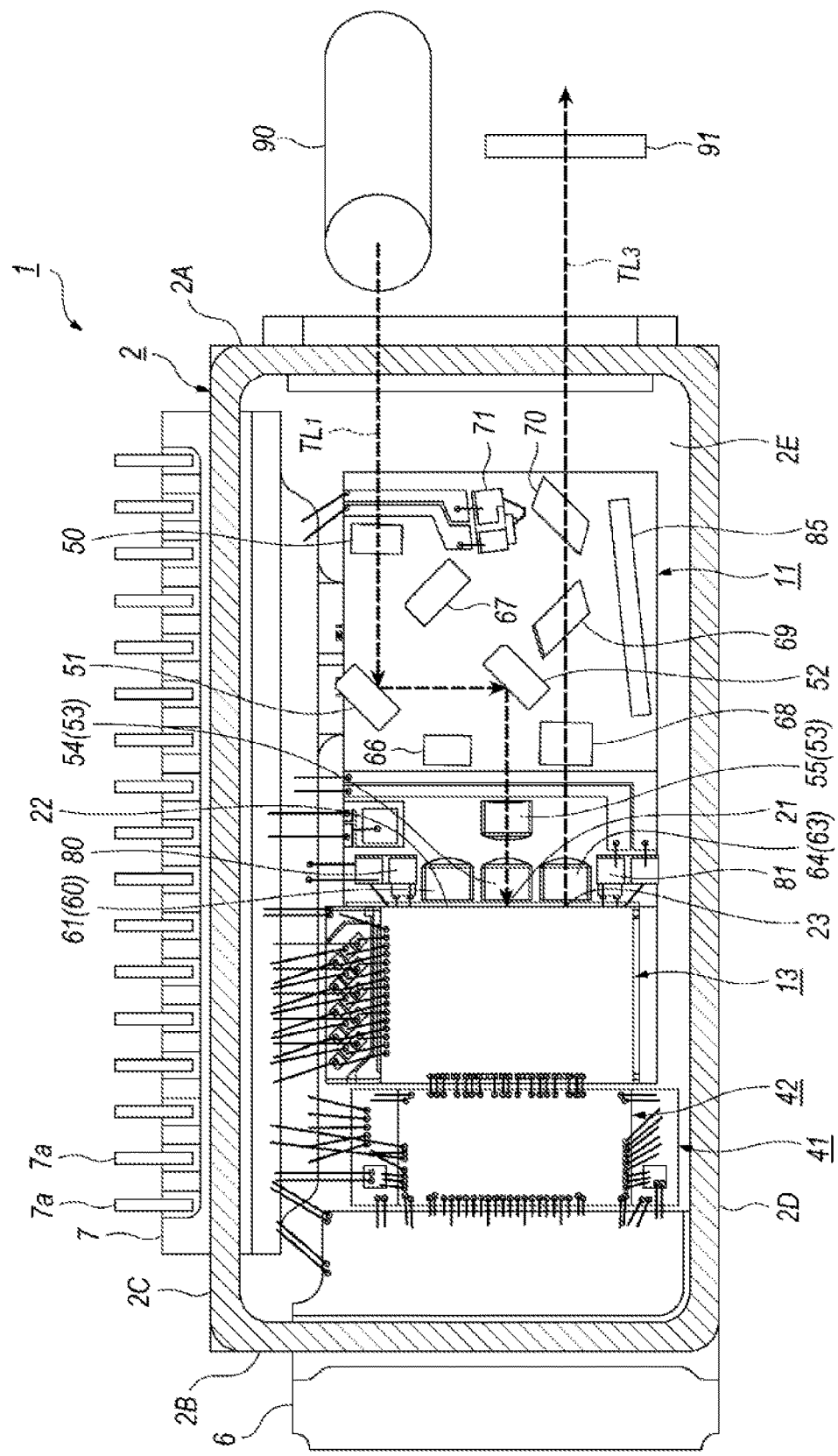

[Fig. 10]
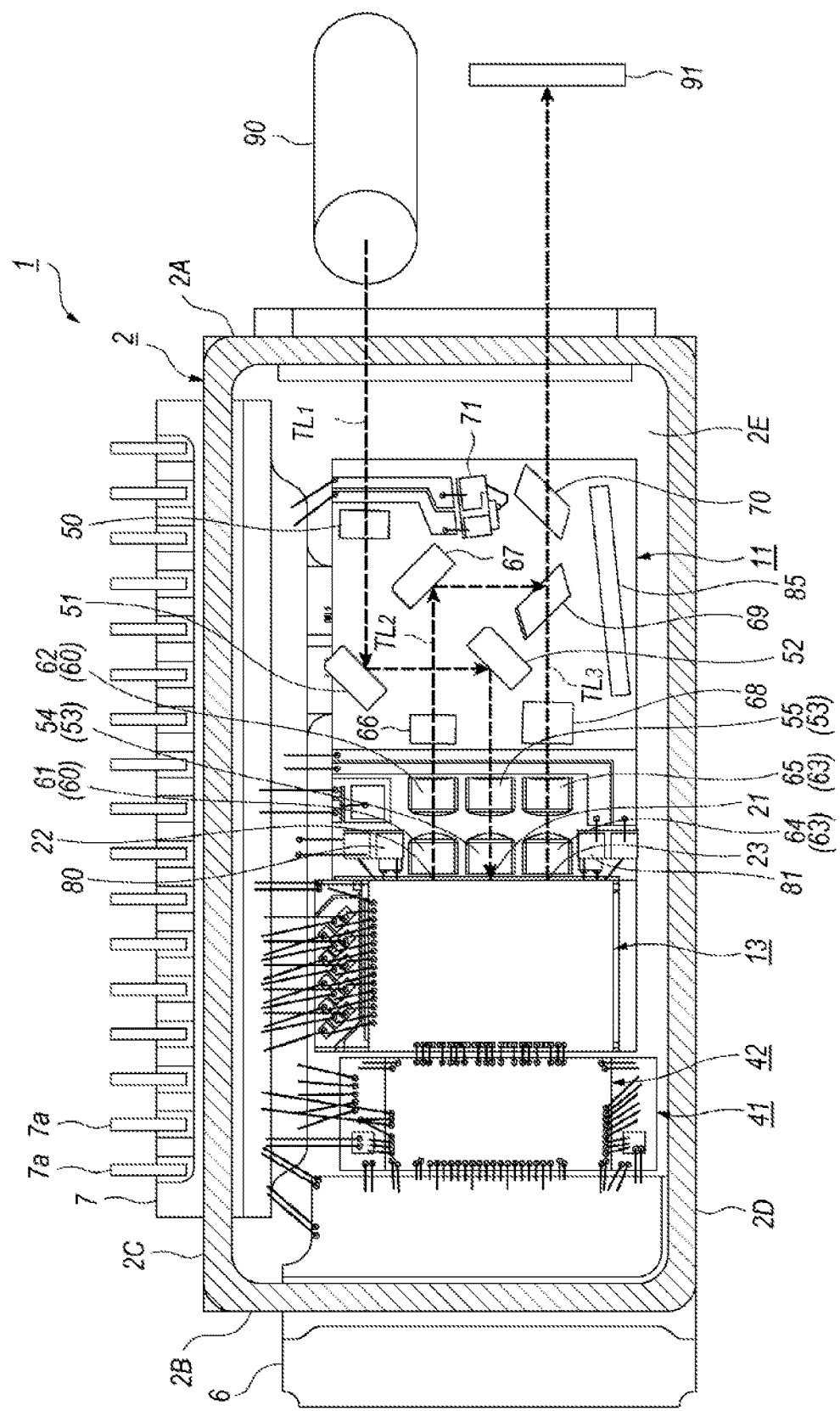

[Fig. 11]
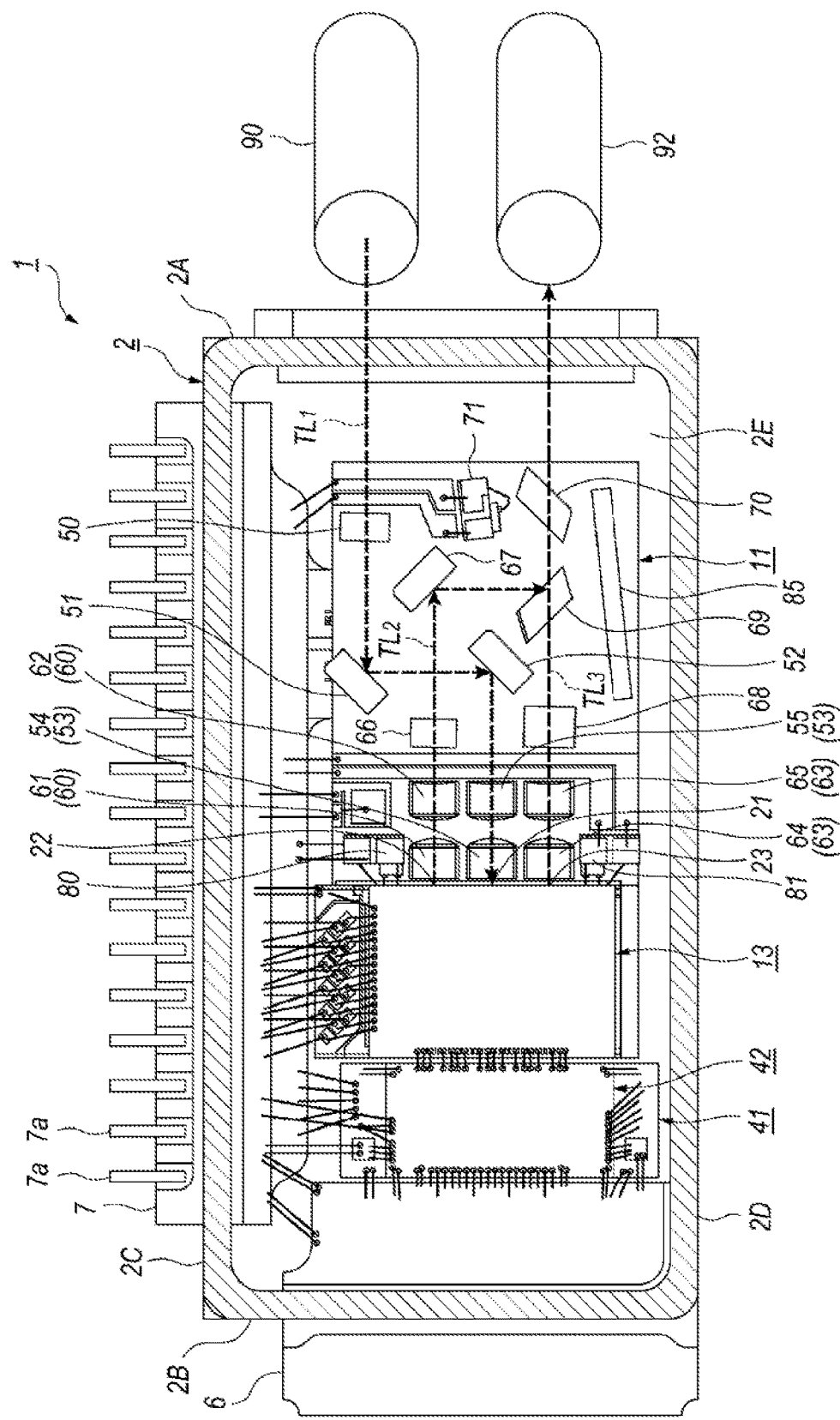

[Fig. 12]
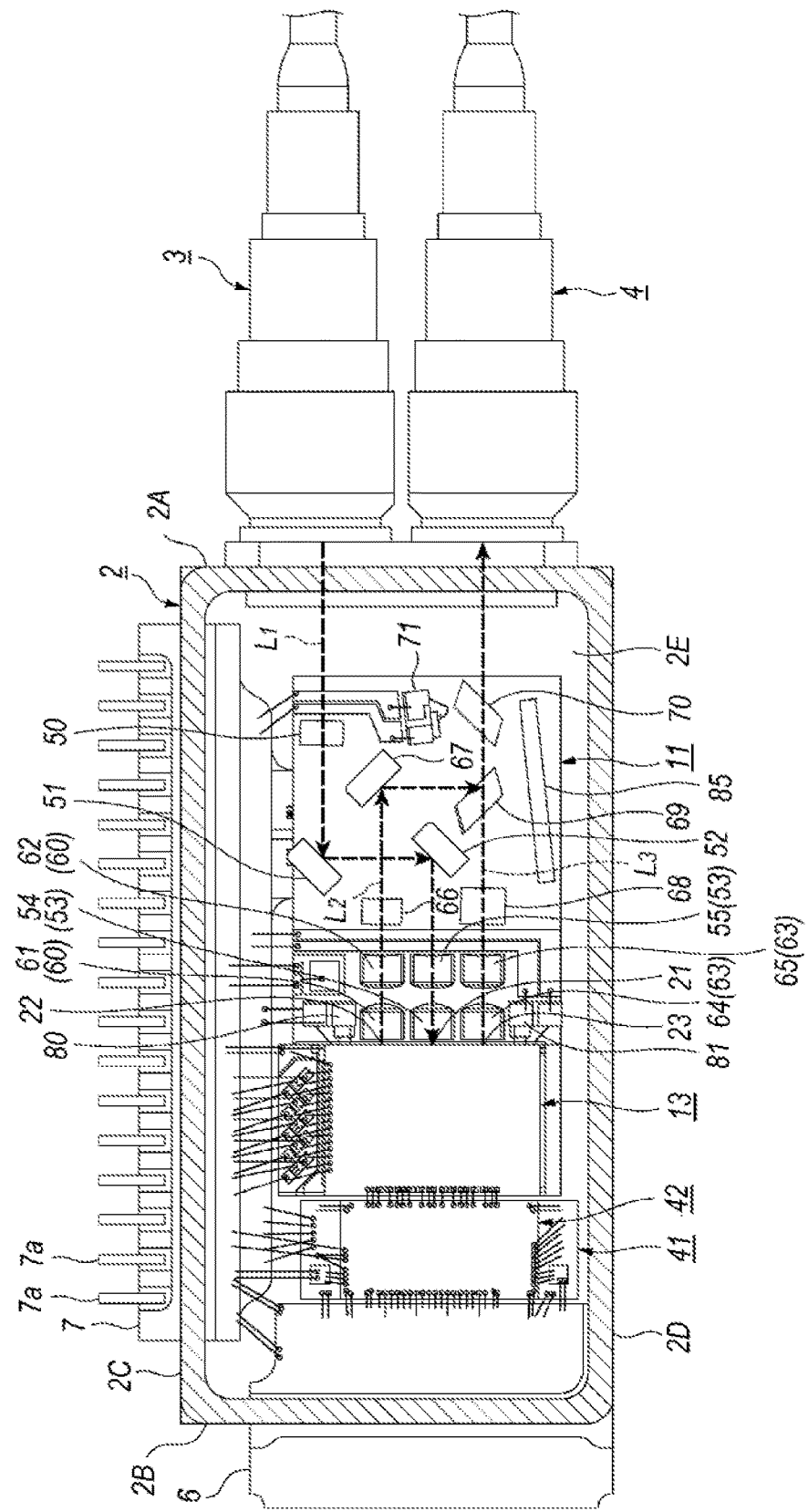

[Fig. 13]
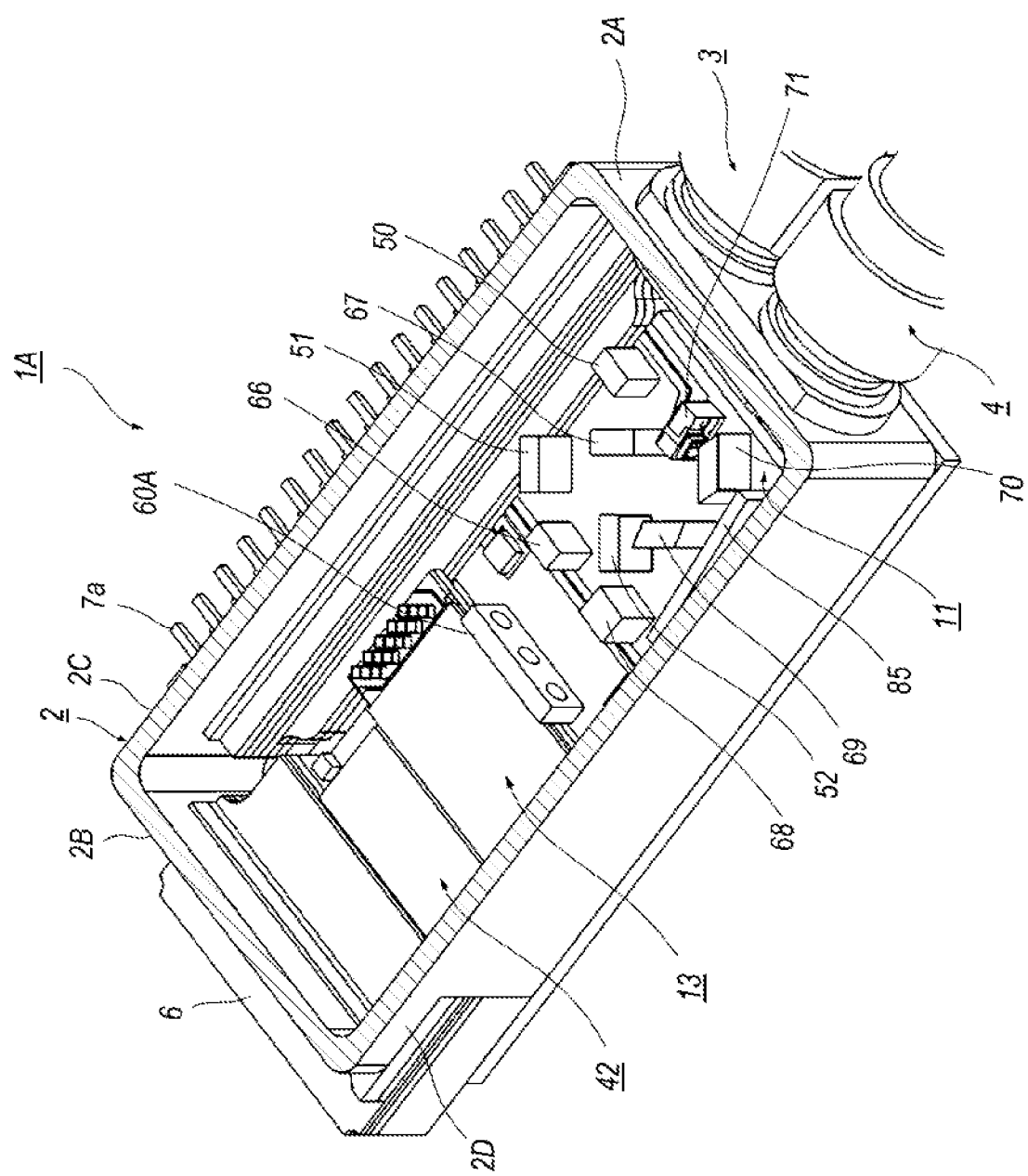

[Fig. 14]
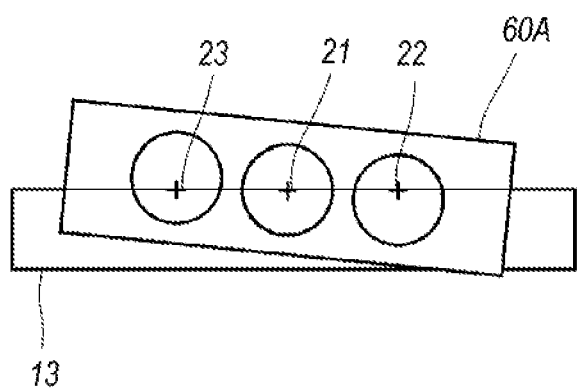

OPTICAL MODULE AND PROCESS OF ASSEMBLING THE SAME

TECHNICAL FIELD

The present application is based on and claims benefit of priority from Japanese Patent Application No. 2017-249023, filed on Dec. 26, 2017, the entire contents of which are incorporated herein by reference. The present invention relates to an optical module and a process of assembling the optical module.

BACKGROUND ART

A Japanese Patent Application laid open No. JP2017-026988A has disclosed an optical module implementing a function corresponding to the dual polarization quadrature phase-shift keying (DP-QPSK). The optical module disclosed therein provides two modulator elements each performing phase modulation for optical beams generated by splitting an input optical beam and outputting thus modulated optical beams. The modulator elements each provide an optical input port in one side of the element, while, two optical output ports in another end of the modulator element opposite to the former side.

Another Japanese Patent Application laid open No. JP2009-229592A has disclosed an optical device that integrates two optical modulators on a substrate common to the optical modulators. The optical modulator modulates optical beams each entering in respective edges of the substrate and outputs output beams in the respective edges of the substrate.

Making a housing of an optical module smaller, or implementing complicated functions within a signal housing of an optical module has been continuously requested in a field of an optical communication. An optical module disclosed in a prior Patent Document of JP2017-026988A with a function of the DP-QPSK is one solution for such a request. The DP-QPSK algorithm may transmit four bit information at the same time by using two optical beams each having polarizations orthogonal to each other and being modulated by the QPSK algorithm Such an optical module generally provides a modulator element having an optical input port and two optical output ports disposed in sides thereof different from each other.

However, such a modulator element inevitably accompanies with two optical coupling systems in the respective side of the modulator element, which requires relatively wide areas for arranging the optical systems, and makes a package of the optical module hard to be formed in compact. Such an arrangement of the coupling systems also makes an optical alignment of the coupling systems complex and hard.

SUMMARY OF INVENTION

An aspect of the present invention relates to an optical module that includes a semiconductor modulator, an input lens system and first and second output lens system, and two monitor photodiodes (PDs). The semiconductor modulator has rectangular plane shape that provides an input port, first and second output ports, and two monitor ports. The semiconductor modulator receives a continuous beam in the input port, split the continuous beam into split beams, modulates the split beams in phases thereof to generate beams, and combines a part of the beams to generate a first output beam that is output from the first output port and also combines a rest of the beams to generate a second output beam that is output from the second output port. The input lens system and the first and second output lens systems each include a rear lens disposed closer the semiconductor modulator and a front lens disposed relatively apart from the semiconductor modulator. The input lens system faces the input port. The first and second output lens systems face the first and second output ports, respectively. The two monitor PDs face the monitor ports of the semiconductor modulator, respectively. The optical module of the present invention has a feature that the semiconductor modulator provides one side in the rectangular shape thereof where the first and second output ports are symmetrically disposed with respect to the input port in the one side, and the two monitor ports are disposed in respective outer sides of the first and second output ports, and symmetrically with respect to the input port also in the one side.

Another aspect of the present invention relates to a process of assembling the optical module. The optical module includes a semiconductor modulator, a housing and input and output assemblies. The semiconductor modulator provides an input port and first and second output ports in one side thereof. The housing encloses the semiconductor modulator therein. The input and output assemblies are provided in one side wall of the housing that faces the one side of the semiconductor modulator. The process includes steps of: (1) aligning an input lens system with the input port of the semiconductor modular so as to optically couple the input port with the input assembly; and (2) aligning first and second output lens system with the first and second output ports of the semiconductor modulator so as to optically couple the first and second output ports with the output assembly.

BRIEF DESCRIPTION OF DRAWINGS

FIG. 1 is a perspective view showing an optical module according to the first embodiment of the present invention;

FIG. 2 is a plan view of the optical module shown in FIG. 1;

FIG. 3 is a cross sectional view of the optical module taken along the line III-III indicated in FIG. 2;

FIG. 4 is a plan view of a semiconductor modulator installed within the optical module shown in FIG. 1;

FIG. 5 is a plan view of the semiconductor modulator shown in FIG. 4, where FIG. 5 removes interconnections and electrodes appearing in FIG. 4;

FIG. 6 is a flow chart of a process of assembling the optical module shown in FIG. 1;

FIG. 7 shows a step of a process of assembling the optical module;

FIG. 8 shows a step of the process subsequent to the step shown in FIG. 7;

FIG. 9 shows a step of the process subsequent to the step shown in FIG. 8;

FIG. 10 shows a step of the process subsequent to the step shown in FIG. 9;

FIG. 11 shows a step of the process subsequent to the step shown in FIG. 10;

FIG. 12 shows a step of the process subsequent to the step shown in FIG. 11;

FIG. 13 is a perspective view of another optical module according to the second embodiment of the invention; and FIG. 14 schematically shows positional relations between the arrayed lens and the input port and the first and second output ports in the semiconductor modulator during the alignment of the lens array.

DESCRIPTION OF EMBODIMENTS

Next, some embodiments of an optical module and a process of assembling the same according to the present invention will be described referring to accompanying drawings. The present invention, however, is not restricted to those embodiments and has a scope defined in claims attached hereto and includes all changed and modification within the claims and equivalents thereto. In the description of the drawings, numerals or symbols same with or similar to each other will refer to elements same with or similar to each other without duplicating explanations.

FIG. 1 is a perspective view of an inside of an optical module 1 according to the present invention; FIG. 2 is a plan view of the optical module 1, and FIG. 3 is a cross sectional view of the optical module 1 taken along the line III-III appearing in FIG. 2, where FIG. 1 partially cuts one of side walls 2D, an input assembly 3, and an output assembly 4. The optical module 1 of the present embodiment, which may be implemented in an optical communication system using the DP-QPSK configuration, provides a box-shaped housing 2, a side wall 2A in one of lateral sides of the housing 2, and the input assembly 3 and the output assembly 4 attached to the side wall 2A.

The housing 2, which is made of, for instance Kovar™, provides for side walls, 2A to 2D, and a bottom 2E. Two side walls, 2A and 2B, face to each other extending in the lateral direction of the housing 2, while, other two side walls, 2C and 2D, also face to each other but extending in the longitudinal direction of the housing 2. The bottom 2E builds the four side walls, 2A to 2D, in a periphery thereof. The side wall 2A provides two windows 5, to which the input assembly 3 and the output assembly 4 are aligned, while, the side wall 2B facing the former side wall 2A provides a feedthrough 6 that implements transmission lines for carrying high frequency signals. The transmission lines receive the high frequency signals through a flexible printed circuit (FPC) board fixed thereto and transmit those high frequency signals within the housing 2. In an alternative, the FPC may be replaced to lead terminals.

The side wall 2C also provides another feedthrough 7, refer to FIG. 2, where the feedthrough 7 has lead terminals 7a; specifically, the lead terminals 7a are fixed to both of a top surface and a back surface of the feedthrough 7, which may increases the count of the lead terminals. Because the optical module 1 of the present embodiment shows a complicated function requesting a number of control signals and biases; a great number of the lead terminals 7a arranged in both surfaces of the feedthrough 7 become inevitable. The lead terminals 7a, which are connected with an external circuit board that mounts the optical module 1 thereon, include those for externally extracting signals generated and formed within the optical module 1, those for supplying biases to components installed within the housing 2, those for providing a ground potential, and so on. The embodiment of the optical module 1 provides the feedthrough 7 only in the side wall 2C, but, in an alternative, the housing 2 may provide still another feedthrough in the side wall 2D.

The input assembly 3 and the output assembly 4 are disposed side by side along the lateral direction of the housing 2. The input assembly 3, as shown in FIG. 1, receives a polarization maintaining fiber (PMF) 8, and includes a coupling part for securing the PMF 8, what is called, a pig-tailed arrangement, and a lens 3a facing the window 5. The lens 3a, which converts a continuous beam $L_1$ into a collimated beam to be provided within the housing 2, has a focal length of, for instance, 2.0 mm. The coupling part and the lens 3a are fixed to each other through a metal member.

The output assembly 4, which receives a single mode fiber (SMF) 9, includes a coupling part for securing the SMF 9 and a lens 4a facing the window 5, where the lens 4a concentrates a output beam $L_4$ modulated in the DP-QPSK algorithm in the housing 2 onto the SMF 9. The lens 4a may have a focal length of, for instance, 2.0 mm. The coupling part and the lens 4a are fixed to each other through a metal member. The housing 2 also provides a lid, which is not illustrated in figures, on the sides walls, 2A to 2D, to enclose a space air-tightly. A space demarcated by the bottom 2E, the side walls, 2A to 2D, and the lid may enclose optical and electrical components air-tightly therein.

The optical module 1 of the embodiment further provides a thermo-electric cooler (TEC) 10, a base 11, a carrier 12, and a semiconductor modulator 13 within the space. The TEC 10 is mounted on the bottom 2E, the base 11 is mounted on the TEC 10, and the semiconductor modulator 13 is mounted on the base 11, where the semiconductor modulator 13 in a temperature thereof is kept constant by the TEC 10.

FIG. 4 is a plan view showing the semiconductor modulator 13, and FIG. 5 is also a plan view of the semiconductor modulator 13 but removes electronic elements such as interconnections and electrodes from those shown in FIG. 4. The semiconductor modulator 13, which is made of indium phosphide (InP) and/or semiconductor materials grouped in InP, has a type of, what is called, the Mach-Zehnder modulator. In an alternative, the semiconductor modulator 13 may be made of gallium arsenide (GaAs) and/or semiconductor materials grouped in GaAs. The semiconductor modulator 13 includes a modulator element 2o, an input port 21, first and second output ports, 22 and 23, a splitter 24, first and second combiners, 25 and 26, some arm waveguides, 27a to 27h, and first and second monitor ports, 28 and 29.

The modulator element 20, which has a substrate made of insulating or semi-insulating InP, has a rectangular or a square plane shape with two longitudinal sides, 20a and 20b, and two lateral sides, 20c and 20d, where the former sides, 20a and 20b, preferably provide a length of 4 to 9 mm, while, the latter sides, 20c and 20d, preferably provide a length of 3 to 12 mm.

The input port 21, which receives a continuous beam $L_1$ from the input assembly 3, is provided in one of the longitudinal sides 20a; specifically, in a center of the longitudinal side 20a. That is, the input port 21 has a distance to one of the lateral sides 20c that is substantially equal to a distance to another of the lateral sides 20d. The input port 21 has an optical axis perpendicular to the longitudinal side 20a; that is, an optical waveguide extending from the input port 21 has the optical axis that is perpendicular to the longitudinal side 20a.

The first and second output ports, 22 and 23, which output output beams, $L_2$ and $L_3$, externally, are provided also in the longitudinal side 20a in positions symmetrical with respect to the input port 21. That is, the first output port 22, which is set in a side closer to one of the lateral sides 20d, sets a distance to the input port 21 that is substantially equal to a distance for the second output port 23, which is set in another side closer to the other of the lateral side 20c, against the input port 21. The first and second output ports, 22 and 23, have optical axes perpendicular to the longitudinal side 20a; that is, optical waveguides extending from the first and second output ports, 22 and 23, have respective optical axes perpendicular to the longitudinal side 20a. A distance between the optical axes of the input port 21 and the first output port 22 is equal to a distance between the optical axes of the input port 21 and the second output port 23. Also, the first output port 22 has a distance against the lateral side 20d that is equal to a distance from the second output port to the other lateral side 20c.

The splitter 24 splits the continuous beam $L_1$ entering in the input port 21 into eight beams each propagating in the arm waveguides, 27a to 27h. The first combiner 25 combines a part of the beams propagating in the four arm waveguides, 27e to 27h, and provides thus combined beams in the first output port 22 as the first output beam $L_2$. The second combiner 26 combines rest of signal beams propagating in the other four arm waveguides, 27a to 27d, and provides thus combined beams in the second output port 23 as the second output beam $L_3$.

The first monitor port 28 monitors magnitude of a beam output from the first combiner 25, while, the second monitor port 29 monitors magnitude of a beam output from the second combiner 26. Those two monitor ports, 28 and 29, are disposed in the longitudinal side 20a, exactly, in respective positions at the longitudinal side 20a symmetrical with respect to the input port 21. The first and second output ports, 22 and 23, and the input port 21 are disposed inside of the first and second monitor ports, 28 and 29.

Specifically, the first monitor port 28 is disposed between the first output port 22 and one of the lateral side 20d, while, the second monitor port 29 is disposed between the second output port 23 and the other of the lateral side 20c. A distance from the first monitor port 28 to the input port 21 is substantially equal to a distance from the second monitor port 29 to the input port 21. Because the input port 21 is provided in the center of the longitudinal side 20a, a distance from the first monitor port 28 to the lateral side 20d is substantially equal to a distance from the second monitor port 29 to the other lateral side 20c.

Referring to FIG. 4, the semiconductor modulator 13 provides eight modulating electrodes, 31a to 31h, four primary phase-adjusting electrodes, 32a to 32d, and eight secondary phase-adjusting electrodes, where the secondary phase-adjusting electrodes are not illustrated in FIG. 4. The modulating electrodes, 31a to 31h, overlap with the arm waveguides, 27a to 27h, to electrically modulate the beams propagating in the arm waveguides, 27a to 27h, by modifying refractive indices of material constituting the arm waveguides, 27a to 27h, which resultantly modifies the phases of the beams propagating within the arm waveguides, 27a to 27h.

One of ends of the modulating electrodes, 31a to 31h, are connected with signal pads, 33a to 33h, through respective interconnections, where the signal pads, 33a to 33h, are coupled with the transmission lines on the feedthrough 6 interposing the driver 42, refer to FIG. 1 to FIG. 3. While, another of the ends of the modulating electrodes, 31a to 31h, are connected with other signal pads, 34a to 34h, for terminating the modulating electrodes, 31a to 31h, and the interconnections. The primary phase-adjusting electrodes, 32a to 32d, which overlap with the optical waveguides in the modulator element 20 to cause a direct current (DC) filed in the respective optical waveguides independently, which modifies refractive indices of the optical waveguides.

The primary phase-adjusting electrodes, 32a to 32d, are electrically connected with the bias pads, 35a to 35d, through respective interconnections. The secondary phase-adjusting electrodes, which overlap with the arm waveguides, 27a to 27h, cause DC fields in the arm waveguides, 27a to 27h, to adjust refractive indices of the arm waveguides, 27a to 27h. The secondary phase-adjusting electrodes are connected with the bias pads, 36a to 36h, for inputting control signals.

The semiconductor modulator 13 shown in FIG. 4 and FIG. 5 disposes the signal pads, 34a to 34h, and the bias pads, 35a to 35d, and 36a to 36h, in the lateral sides, 20c and 20d, respectively. However, the semiconductor modulator 13 may dispose those pads, 34a to 34h, 35a to 35d, and 36a to 36h, in one of the lateral sides, 20c or 20d. The bias pads, 35a to 35d, and 36a to 36h, are electrically connected with lead terminals 7a provided in the feedthrough 7.

Referring to FIG. 1 to FIG. 3 again, the optical module 1 further provides a heat sink 40, a circuit board 41, and the driver 42 in the housing 2. The heat sink 40 is disposed on the bottom between the feedthrough 6 and the TEC 10 along the longitudinal direction of the housing 2. The heat sink 40, which is made of material having good thermal conductivity, for instance, aluminum nitride (AlN), mounts the circuit board 41 thereon. The circuit board 41, which is a type of multi-layered printed board, is electrically connected with the lead terminals 7a in the feedthrough 7. The driver 42, which is mounted on the circuit board 41, is electrically connected with the circuit board 41, exactly, interconnections provided on the circuit board 41, through bonding wires. Also, the driver 42 is connected with the transmission lines on the feedthrough 6 and the semiconductor modulator 13 through bonding wires. The driver 42 amplifies and re-shapes the driving signals provided from the transmission lines on the feedthrough 6 and provided to the semiconductor modulator 13.

The optical module 1, as shown in FIG. 1 to FIG. 3, further provides optical elements of a polarizer 50, mirrors, 51 and 52, and an input lens system 53 in order to optically couple the input assembly 3 with the input port 21 of the semiconductor modulator 13. Those optical elements, 50 to 53, are mounted on the base 11 through an adhesive. The polarizer 50, which is disposed on the optical axis of the input assembly 3, re-shapes the polarization of the continuous beam $L_1$ coming from the input assembly 3. Even when the process of assembling the optical module 1 shifts or rotates the polarization direction of the continuous beam $L_1$ that is aligned with the PMF 8, in other words, even when the PMF 8 in the polarization angle thereof deviates from a designed one, the polarizer 50 may extract the polarization component of one of 0° or 90° as the continuous beam $L_1$. The mirror 51, which is optically coupled with the input assembly 3 through the polarizer 50, reflects the continuous beam $L_1$ coming from the polarizer 50 toward the other mirror 52. The continuous beam $L_1$ outgoing from the mirror 51 and that incoming to the mirror 51 makes substantially a right angle.

The mirror 52, which provides a reflecting surface that optically couples with the input port 21 and the mirror 51, is disposed closer to the side wall 2D compared with the minor 51 and on an optical axis of the input port 21. The mirror 52, which receives the continuous beam $L_1$ from the mirror 51, reflects the continuous beam $L_1$ toward the input port 21. Thus, the optical axis of the continuous beam $L_1$ in the incoming part and the outgoing part thereof makes a right angle, which means that the optical axis of the continuous beam $L_1$ in the outgoing part thereof becomes parallel to the optical axis of the input assembly 3; that is, the set of the mirrors, 51 and 52, makes the parallel translation of the optical axis of the input assembly 3 so as to align with the optical axis of the input port 21.

The input lens system 53 is disposed on the optical axis of the input port 21 between the mirror 52 and the input port 21 and faces the input port 21. The input lens system 53, which concentrates the continuous beam $L_1$ reflected by the mirror 52 onto the input port 21, includes a rear lens 54 and a front lens 55, where the rear lens 54 is disposed closer to and faces the input port 21, while, the front lens 55 interposes the rear lens 54 with respect to the input port 21. The rear lens 54 may have a focal length of, for instance, 0.51 mm.

As described above, the front lens 55, which is disposed between the rear lens 54 and the mirror 52, may have a focal length of, for instance, 2.1 mm. In the optical module 1 of the present embodiment, the continuous beam $L_1$ passes three lenses in an optical path from the PMF 8 to the input port 21, namely, that provided in the input assembly 3, the front lens 55, and the rear lens 54. Specifically, the continuous beam $L_1$ is output from the PMF 8, converted into a collimated beam by the lens 3a in the input assembly 3, and concentrated onto the input port 21 by a combination of the front lens 55 and the rear lens 54. Among three lenses, 3a, 54, and 55, the front lens 55 is not always necessary; that is, the continuous beam $L_1$ is concentrated onto the input port 21 only by the rear lens 54 after converted into the collimated beam by the lens 3a.

Also, the optical module 1 further provides another optical coupling system for the first and second output lens systems, 60 and 63, where the optical coupling system includes a half-wavelength plate ($\lambda/2$) plate 66, where $\lambda$ is a wavelength of the continuous beam $L_1$, a mirror 67, a skew adjustor 68, a polarization beam combiner (PBC) 69, and a beam splitter 70, each optically coupled with the output assembly 4, and two output ports, 22 and 23, in the semiconductor modulator 13. Those optical components are fixed on the base 11 with an adhesive after optically aligned with the semiconductor modulator 13.

The first and second output lens systems, 60 and 63, are disposed in respective sides of the input lens system 53; specifically, the first output lens system 60 is arranged between the side wall 2C and the input lens system 53 so as to face the first output port 22, exactly, placed on the optical axis of the first output port 22. The first output lens system 60, which includes a rear lens 61 disposed relatively closer to the semiconductor modulator 13 and a front lens 62 disposed relatively apart from the semiconductor modulator 13, converts the output beam $L_2$ output from the first output port 22 into a collimated beam. The rear lens 61, which faces the first output port 22, has a focal length of, for instance, 0.51 mm; while, the front lens 62, which optically couples with the first output port 22 through the rear lens 61, is put between the rear lens 61 and the half-wavelength plate 66 and may have a focal length of for instance, 2.1 mm.

The second output lens system 63, which is disposed between the side wall 2D and the input lens system 53, faces the second output port 23, exactly, the second output lens system 63 is placed on the optical axis of the second output port 23 to convert the second output beam $L_3$ output from the second output port 23 of the semiconductor modulator 13 into a collimated beam. The second output lens system 63 also includes a rear lens 64 disposed relatively closer to the semiconductor modulator 13 and a front lens 65 disposes relatively apart from the semiconductor modulator 13.

The rear lens 63, which is disposed so as to face the second output 23, may have a focal length of 0.51 mm. The front lens 65, which is also optically coupled with the second output port 23 but through the rear lens 64, is disposed between the skew adjustor 68 and the second output port 23. The front lens 65 may have a focal length of, for instance, 2.1 mm.

In the optical module 1 according to the present embodiment, the first output beam $L_2$ output from the first output port 22 passes three lenses, namely, the rear lens 61, the front lens 52 and the lens 42a in the output assembly 4. Specifically, the first output beam $L_2$ output from the first output port 22 as a divergent beam is converted into a collimated beam by a combination of the rear lens 61 and the front lens 62, multiplexed with the second output beam $L_3$ that is also a collimated beam, and finally concentrated onto the SMF 9 by the lens 4a in the output assembly 4. Among three lenses, 61, 62, and 4a, the front lens 62 is not unavoidable, that is, may be omitted. That is, the first output beam $L_2$ output from first output port 22 may be concentrated onto the SMF 9 through the rear lens 61 and the lens 4a.

Also, the other output beam $L_3$ output from the second output port 23 passes three lenses, namely, the rear lens 64, the front lens 65, and the lens 4a in the output assembly 4. The second output beam $L_3$ output from the second output port 23 as a divergent beam is converted into a collimated beam by a combination of the rear lens 64 and the front lens 65 in the second output lens system 63 and concentrated onto the SMF 9 by the lens 4a in the output assembly 4. Among three lenses, 64, 65, and 4a, the front lens 65 is not unavoidable, that is, may be removed from the optical coupling system. The second modulate beam $L_3$ may be concentrated onto the SMF 9 by the two lens system including the rear lens 64 and the lens 4a in the output assembly.

The half-wavelength plate 66, which may be denoted as a $\lambda/2$ plate and disposed on the optical axis of the front lens 62, rotates the polarization of the second output beam $L_3$ output from the second output port 23 by 90° so as to be orthogonal with the polarization of the first modulate beam $L_2$ output from the first output port 22. The embodiment shown in FIG. 2 disposes the $\lambda/2$ plate 66 on the optical axis of the front lens 62, but the $\lambda/2$ plate 66 may be provided on the optical axis of the other front lens 65 in the second output lens system 63. That is, the $\lambda/2$ plate 66 is necessary to be disposed on an optical axis of at least one of the front lenses, 62 and 65, to rotate the polarization of one of the output beams, $L_2$ or $L_3$, so as to be orthogonal with the polarization of the other of the output beams, $L_2$ or $L_3$.

The mirror 67, which optically couples with the front lens 62 in the first output lens system 60 through the $\lambda/2$ plate 66, reflects the first output beam $L_2$ passing the $\lambda/2$ plate 66 toward the polarization beam combiner (PBC) 69. The first output beam $L_2$ in the optical axis of the incoming beam to the mirror 67 makes a right angle against the first output beam $L_2$ in the optical axis of the outgoing beam from the mirror 67. The skew adjuster 68, which may be a rectangular block made of silicon (Si), lengthens an equivalent optical length for the second output beam $L_3$ passing therethrough to compensate a phase delay caused in the first output beam $L_2$ by passing the $\lambda/2$ plate 66. That is, the equivalent optical length of the skew adjuster 68 is substantially equal to an equivalent optical length of the 212 plate 66. The second output beam $L_3$ reaches the PBC 69 passing the skew adjustor 68.

The PBC 69, which optically couples with both of the first and second output ports, 22 and 23, is disposed on the optical axis of the front lens 65 of the second output lens system 63, that is, on the optical axis of the second output port 23. The PBC 69 provides a polarization selective filter in one surface thereof facing the mirror 67, while, an anti-reflection film in another surface opposite to the former one. The polarization selective filter shows substantial reflectance, namely substantially no transmittance, for a beam with a polarization parallel to an incident plane, while shows substantial transmittance, or substantially no reflectively, for a beam with a polarization perpendicular to the incident plane, where the incident plane is formed by an optical axis of a beam incoming there to and a normal of the filter. Or, the polarization selective filter shows substantial transmittance, namely substantially no reflectance, for a beam with a polarization parallel to the incident plane, while shows substantial reflectance, namely substantially no transmittance, for a beam with a polarization perpendicular to the incident plane.

The first output beam $L_2$, which is output from the first output port 22, is reflected toward the PBC 69 by the mirror 67 and reflected again by the PBC 69 toward the output assembly 4. On the other hand, the second output beam $L_3$, passing the skew adjuster 68, enters the PBC 69. Because two output beams, $L_2$ and $L_3$, have the polarization same to each other at the first and second output ports, 22 and 23, of the semiconductor modulator 13, but the former output beam $L_2$ enters the mirror 67 after passing the 212 plate 66 that rotates the polarization thereof by 90°; accordingly, two output beams, $L_2$ and $L_3$, has the polarization orthogonal to each other at the PBC 69. That is, the PBC 69 may have substantial reflectance for the first output beam $L_2$ coming from the mirror 67 and to be reflected toward the output assembly 4; while, shows substantial transmittance for the second output beam $L_3$ coming from the skew adjuster 68 and to be transmitted toward the output assembly 4. Thus, the PBC 69 may multiplex two output beams, $L_2$ and $L_3$.

The BS 70, which is disposed between the PBC 69 and the output assembly 4, has a parallelepiped shape with an incoming surface and an outgoing surface parallel to each other, where the incoming surface provides a reflective film that reflects a portion of an incident beam, specifically reflectivity around 5%, of the incident beam $L_4$ and transmits a rest (around 95%) thereof, where the beam $L_4$ is generated by multiplexing the two output beams, $L_2$ and $L_3$, at the PBC 69. A beam reflected by the BS 70 enters a monitor photodiode (PD) 71 that is electrically connected with one of lead terminals 7a. The monitor PD 71 may generate an electrical signal corresponding to power of a beam split by the BS 70 from the multiplexed beam $L_4$. Rest of the multiplexed beam $L_4$ enters the output assembly 4.

The optical module 1 further provides other monitor PDs, namely, first and second monitor PDs, 80 and 81, in the housing 2, specifically in respective sides of the rear lenses, 61 and 64, in the output lens systems, 60 and 63, and on the base 11. The first and second monitor PDs, 80 and 81, are disposed sandwiching the rear lenses, 54, 61, and 64.

The first monitor PD 80, which is disposed on the optical axis of the first monitor port 28 between the rear lens 61 and the side wall 2C, faces the first monitor port 28 of the semiconductor modulator 13. The first monitor PD 80 detects a monitor beam output from the first monitor port 28 and generates a signal corresponding to power of the monitor beam. The signal is output from one of the lead terminals 7a connected with the first monitor PD 80 with a bonding wire.

The second monitor PD 81, which is disposed on the optical axis of the second monitor port 29 between the rear lens 64 of the second output lens system 63 and the sides wall 2D, faces the second monitor port 29. The second monitor PD 81 detects a monitor beam output from the second monitor port 29 and generates a signal corresponding to power of the detected monitor beam. The signal generated by the second monitor PD 81 is output through one of the lead terminals 7a connected with the second monitor PD 81 through a bonding wire.

The optical module 1 according to the present embodiment further provides an anti-reflection plate 85 one the base 11. The anti-reflection plate 85 is disposed behind the mirror 52, the PBC 69, and the BS 70; that is between components of the mirror 52, the PBC 69, and the BS 70, and the sides wall 2D. The continuous beam $L_1$ provided from the input assembly 3 is reflected toward the mirror 52 by the mirror 51. The continuous beam $L_1$ reaching the mirror 52 is almost reflected by the mirror 52; but a faint portion thereof transmits the mirror 52 to reach the anti-reflection plate 85. Also, a faint portion of the first output beam $L_2$ reflected by the mirror 67 toward the PBC 69 transmits the PBC 69 and reaches the anti-reflection plate 85. The anti-reflection plate 85 may prevent those beams reaching thereto from the mirror 52 and the PBC 69 from being reflected by the side wall 2D.

The optical module 1 thus described modulates the continuous beam $L_1$ entering through the input assembly 3 by the semiconductor modulator 13 after split into the arm waveguides, 27a to 27h. The optical circuit provided in downstream of the semiconductor modulator 13 rotates the polarization of one of the output beams $L_2$ by 90° and multiplexes the one of the output beams $L_2$ with the other of the output beam $L_3$ by the PBC 69. The PBC 69 outputs the multiplexed beam $L_4$ toward the output assembly 4. Thus, the optical module 1 may concurrently transmits information corresponding to four (4) bits.

Second Embodiment

Next, a process of assembling the optical module 1 will be described referring to FIG. 6 to FIG. 12, where FIG. 6 is a flow chart of the process of assembling the optical module 1, while FIG. 7 to FIG. 12 are plan views of the optical module 1 at respective steps of the process.

First, the process installs optical components including the semiconductor modulator 13 within the housing 2 at a step $P_1$. Then, the rear lens 54 of the input lens system 53 will be optically aligned at steps $P_2$. Specifically, as shown in FIG. 7, the process prepares a dummy fiber 90 that emulates the input assembly 3, where FIG. 7 to FIG. 11 schematically illustrates the dummy fiber 90. The dummy fiber 90 may output a test beam $TL_1$ used in optical alignment of the input lens system 53. The test beam $TL_1$ provided from the dummy fiber 90, which is a continuous wave (CW) and has a wavelength equal to a wavelength of the continuous beam $L_1$, is a collimated beam converted by a lens that is not illustrated in the figures.

The process first aligns the dummy fiber 90. As shown in FIG. 7, entering the test beam $TL_1$ within the housing 2 from the dummy fiber 90, the process detects magnitude of the test beam $TL_1$ reaching the input port 21 passing the polarizer 50 and the mirrors, 51 and 52 by at least one of the monitor PDs, 80 and 81. Sliding the dummy fiber 90 on the outer surface of the side wall 2A of the housing 2, the process determines the position of the dummy fiber 90 where the magnitude detected by one of the monitor PDs, 80 and 81, becomes a maximum. Because the test beam $TL_1$ is a collimated beam, the process may detect a maximum of the detected magnitude in spite of limited dimensions of the input port 21.

The test beam $TL_1$ is preferably detected in maximum magnitude thereof by both of the first and second monitor PDs, 80 and 81, because the optical coupling efficiency becomes extremely small when the test beam $TL_1$ is directly coupled with the input port 21 without interposing any lenses. In an arrangement where both of the first and second monitor PDs, 80 and 81, are utilized for detecting the magnitude of the test beam $TL_1$, a sum of the outputs from the first and second monitor PDs, 80 and 81, becomes substantial and the evaluation of the magnitude becomes simple and easy.

Thereafter, as shown in FIG. 8, the process mounts the rear lens 54 onto the base 11 and disposes so as to face the input port 21. Entering the test beam $TL_1$ within the housing 2 through the dummy fiber 90, the test beam $TL_1$ may be utilized for aligning the rear lens 54. Specifically, the test beam $TL_1$ entering the input port 21 passing the rear lens 54 is detected by the first and second monitor PDs, 80 and 81, slightly shifting a position of the rear lens 54 on the optical axis thereof to find a position where the magnitude of the test beam $TL_1$ detected by the first and second monitor PDs, 80 and 81, become maximum Thereafter, the rear lens 54 is slightly shifted toward the semiconductor modulator 13 and fixed thereat to the base 11 by, for instance, ultraviolet curable resin.

Then, disposing the front lens 55 in the input lens system 53 in the housing 2, the process optically aligns the front lens 55 and fixes to the base 11 at step $P_3$. Specifically, disposing the front lens 55 onto the base 11 so as to face the input port 21 through the rear lens 54, the test beam $TL_1$ is provided from the dummy fiber 90 to enter the input port 21 through the front lens 55 and the rear lens 54. The first and second monitor PDs, 80 and 81, detect the magnitude of the test beam $TL_1$ as slightly shifting the position of the front lens 55 along the optical axis thereof to find a position where the test beam $TL_1$ detected by the first and second monitor PDs, 80 and 81, becomes maximum. The front lens 55 is fixed to the base 11 with ultraviolet curable adhesive.

Thereafter, the process aligns the first and second output lens systems, 60 and 63. In advance to the alignment, the process adjusts the semiconductor modulator 13. Specifically, the semiconductor modulator 13 in phase statuses in respective waveguides are adjusted such that the test beams, $TL_2$ and $TL_3$, each output from the first and second output ports, 22 and 23, become maxima by varying biases supplied to the semiconductor modulator 13. The biases that maximize intensities of the output beams, $L_2$ and $L_3$, are determined in advance to the adjustment at step $P_6$ described later.

Thereafter, as shown in FIG. 9, disposing the rear lens 61 in the first output lens system 60 and the rear lens 64 in the second output lens system 63 within the housing 2, those rear lenses, 61 and 64, are aligned and fixed at a step $P_4$. First, the process mounts the rear lenses, 61 and 64, onto the base 11 such that the rear lens 61 faces the first output port 22, while, the rear lens 64 faces the second output port 23.

Then, a camera 91 is prepared outside of the optical module 1. The camera 91 is placed so as to face the side wall 2A to which the output assembly 4 is to be attached such that the camera 91 becomes enough apart from the side wall 2A. Then, entering the test beam $TL_1$ into the input port 21 from the dummy fiber 90, the first output port 22 outputs the test beam $TL_2$ and the second output port 23 outputs the test beam $TL_3$, refer to FIG. 10 to FIG. 12.

When the rear lens 64 in the second output lens system 63 is to be aligned, biases are supplied such that only the second output port 23 outputs the test beams $TL_3$, that is, substantially no test beam $TL_2$ is output from the first output port 22. Inspecting a field pattern of the test beam $TL_3$ coming from the second output port 23 by the camera 91, the rear lens 64 is aligned such that the inspected profile of the test beam $TL_3$ becomes that of a collimated beam. Also, when the rear lens 61 in the first output lens system 60 is to be aligned, biases are supplied to the semiconductor modulator 13 such that only the first output port 22 outputs the test beam $TL_2$. Inspecting the field pattern of the test beam $TL_2$ by the camera 91, the rear lens 61 is aligned such that the inspected pattern of the test beam $TL_2$ becomes that of the collimated beam. Finally, the rear lenses, 61 and 64, are slightly shifted along the optical axes thereof so as to be apart from the semiconductor modulator 13 from points where the maximum intensity of the test beams, $TL_2$ and $TL_3$, are observed. After slightly shifting the rear lenses, 61 and 64, the rear lenses, 61 and 64, are fixed to the base 11 with adhesive curable by ultraviolet rays.

Thereafter, as shown in FIG. 10, the front lenses, 62 and 65, in the first and second output lens systems, 60 and 63, respectively, are installed within the housing 2 at step $P_5$. Specifically, the front lenses, 62 and 65, are placed on the base 11 so as to face the first and second output ports, 22 and 23, through the respective rear lenses, 61 and 64, to align with the semiconductor modulator 13 and fix to the base 11. That is, similar to the procedures for the rear lenses, 61 and 64, entering the test beam $TL_1$ into the input port 21 of the semiconductor modulator 13 from the dummy fiber 90 and inspecting the test beams, $TL_2$ and $TL_3$, output from the output ports, 22 and 23, by the camera 91; the process sets the front lenses, 62 and 65, in respective positions where the test beams, $TL_2$ and $TL_3$, become collimated beams.

Thereafter, as shown in FIG. 11, the process prepares another dummy fiber 92, where FIG. 11 schematically illustrates the dummy fiber 92. The dummy fiber 92, which emulates the output assembly 4 and provides a lens that concentrates a test beam entering therein onto the dummy fiber 92. The process aligns the dummy fiber 92 so as to optically couple with the front lenses, 62 and 65. Specifically, entering the test beam $TL_1$ in the semiconductor modulator 13 from the dummy fiber 90, the semiconductor modulator 13 outputs the test beams, $TL_2$ and $TL_3$, from the first and second output ports, 22 and 23. The process may selects one of the output ports, 22 or 23, to output the test beam, $TL_2$ or $TL_3$, by adjusting biases supplied to the semiconductor modulator 13.

The process next compares maximum power of the test beam $TL_2$ with maximum power of the other test beam $TL_3$ at step $P_6$, where the maximum power of the test beams, $TL_2$ or $TL_3$, is the power detected through the dummy fiber 92. The process first adjusts the bias provided to the semiconductor modulator such that only one of the output ports, 22 and 23, generates the test beam, $TL_2$ or $TL_3$. In a case where the first output port 22 generates the test beam $TL_2$, this test beam $TL_2$ enters the dummy fiber 92 passing the rear lens 61 and the front lens 62. The front lens 62 may be adjusted in a position where the test beam $TL_2$ detected through the dummy fiber 92 shows maximum power. Contrary, in a case where only the second output port 23 generates the test beam $TL_3$, the test beam $TL_3$ enters the dummy fiber 92 passing the rear lens 64 and the front lens 65. Accordingly, the front lens 65 is set in a position where the test beam $TL_3$ detected through the dummy fiber 92 shows maximum power.

Step $P_6$ sets the biases supplied to the semiconductor modulator 13 such that the test beams, $TL_2$ and $TL_3$, show respective maximum power, where bias conditions at which the test beams, $TL_2$ and $TL_3$, show the respective maximum power may be determined such that bias conditions that shows the power of the first test beam $TL_2$ becomes maximum are first determined, then another bias conditions that shows the power of the second test beam $TL_3$ becomes maximum. Concurrently with the step of determining the maximum power described above, the process also finds bias conditions that minimizes the power of the first test beam $TL_2$ and another bias conditions that also minimizes the power of the second test beams $TL_3$. This is because, when one of the front lenses, 62 or 65, that is contained in the output lens system, 60 or 63, showing greater maximum power, is fixed subsequent to the other of the front lenses, 62 or 65, the test beam, $TL_2$ or $TL_3$, provided from the other of the front lens, 62 or 65, possibly degrades positional preciseness of the front lens, 62 or 65, accordingly, the other test beam $TL_2$ or $TL_3$ coming from the front lens, 62 or 65, already fixed is necessary to be minimized.

The maximum power of the test beam $TL_2$ inevitably becomes different from the maximum power of the other test beam $TL_3$ because optical losses attributed to the waveguides in the semiconductor modulator 13 are difference from each other, and those of the optical coupling systems from the first output port 22 to the dummy fiber 92 and from the second output port 23 to the dummy fiber 92, such as the mirror 67 and/or the PBC 69, are also difference from each other.

Accordingly, the embodiment of the present process first fixes one of the front lenses, 62 or 65, that shows greater maximum power for the dummy fiber 92 at a step $P_7$. Then, another front lens, 62 or 65, that shows smaller maximum power for the dummy fiber 92 is subsequently fixed. The front lens, 62 or 65, showing the greater maximum power is aligned along the optical axis thereof such that the power of the test beam, $TL_2$ or $TL_3$, detected through the dummy fiber 92 becomes closer to the smaller maximum power, or becomes substantially equal to the smaller maximum power, obtained for the other of the front lens, 62 or 65, at a step $P_8$. An adhesive, such as ultraviolet curable resin, may permanently fix the front lenses, 62 and 65, on the base 11 after the alignment thereof at a step $P_9$.

Thereafter, the process attaches the lid to the side walls, 2A to 2D, and replaces the dummy fibers, 90 and 92, with the input and output assemblies, 3 and 4, respectively. The input and output assemblies, 3 and 4, may be welded by YAG-laser to the housing 2. Specifically, entering the continuous beam $L_1$ from the input assembly 3, the output beams, $L_2$ and $L_3$, are detected through the output assembly 4 as aligning the input and output assemblies, 3 and 4, against the housing 2, which is often called as a three-body alignment. Sliding the input and output assemblies, 3 and 4, on the side wall 2A, the positions of the assemblies, 3 and 4, are determined at which one of the output beams, $L_2$ or $L_3$, becomes a maximum at a step $P_{10}$. The positions of the assemblies, 3 and 4, become equal to the positions of the dummy fibers, 90 and 92. During the alignment of the assemblies, 3 and 4, the biases supplied to the semiconductor modulator 13 are set such that one of the output beams, $L_2$ or $L_3$, becomes a maximum. After the alignment of the assemblies, 3 and 4, the YAG laser welding may fix the assemblies with the side wall 2A. The input assembly 3 is adjusted in a rotation angle thereof to be the designed angle.

Advantages of the optical module 1 and the process of assembling the same will be described. Because the semiconductor modulator 13 of the present embodiment provides the input port 21 and two output ports, 22 and 23, only in one side 20a of the modulator element 20, the optical components that couple those optical ports, 21 to 23, with the input assembly 3 and the output assembly 4 may be disposed only in one side of the modulator element 20 in the housing 2, which may make the optical module 1 compact. Moreover, the arrangement of the two output ports, 22 and 23, disposed symmetrically with respect to the input port 21 may enhance design flexibility of the dispositions of those optical components. Also, the arrangement of the first output port 22 enough apart from the second output port 23 may widen effective areas for placing the respective optical components and increase the flexibility of the dispositions thereof. The semiconductor modulator 13 with the input and output ports, 21 to 23, only in one of sides 20a makes the optical alignment of the components effective and simple, which also makes the production of the optical module 1 simple. This arrangement, where the semiconductor modulator 13 sets an area facing the side 20a for mounting the optical components, an area facing the side 20d for wiring to the lead terminals 7a, and an area facing the side 20b for mounting the driver 42, may use the respective areas effectively and make the production of the optical module 1A simple.

In the optical module 1, the first output beam $L_2$ output from the first output port 22 passes three lenses, 61, 62, and 4a, to the SMF 9; while the second output beam $L_3$ output from the second output port 23 also passes three lenses, 64, 65, and 4a, to the SMF 9. Setting the magnification ratio of the rear lenses, 61 and 64, to be four (4) and those of the front lenses, 62 and 65, and the lens 4a to be unity (1); the SMF 9 effectively couples with the mode field diameter of the first and second output ports, 22 and 23. Also, the process first aligns the rear lenses, 61 and 64, that are necessary to be precisely disposed because of the substantial magnification ratio thereof, then aligns the front lenses, 62 and 65, which sets the SMF 9 effectively aligned with the first and second output ports, 22 and 23.

In the two-lens system having a rear lens, 61 or 64, and a front lens 3a, that is the lens 3a in the input assembly operates as the front lens in the embodiment and the front lens, 62 or 65, is omitted, the rear lens, 61 or 64, is inevitably requested to be precisely aligned, typically less than 0.3 μm, to suppress optical losses due to positional deviations of the lens. However, those lenses, 61 and 64, are fixed with a resin, typically, with an ultraviolet curable resin, and the resin usually shrinks during solidifying or expands by heat treatment, which makes hard for once aligned optical components to maintain positional preciseness, or to maintain positional preciseness smaller than 1.0 μm. Contrary, the three lens system like the present embodiment may alleviate the positional preciseness in the front lens put between the lenses compared with the two lens system. Preciseness greater than 1.5 μm may be sometimes allowed. Thus, the center lens in the assembly thereof becomes simple and easy. Also, because the rear lens, 61 or 64, are disposed in a position where the beam output from the rear lens, 61 to 64, becomes divergent beam, the front lens, 62 or 65, may be disposed closer to the rear lens, 61 or 64, to convert the beam output from the front lens, 62 or 65, into a collimated beam, which may shorten the longitudinal dimension of the housing 2.

Also, in the arrangement of the present optical module 1, the first and second monitor ports, 28 and 29, are symmetrically disposed with respect to the input port 21 in the side 20a; the first and second output ports, 22 and 23, and the input port 21 are disposed between the monitor ports, 28 and 29; and the first and second monitor PDs, 80 and 81, are disposed facing the first and second monitor ports, 28 and 29. This arrangement may dispose the first and second monitor PDs, 80 and 81, in respective sides of the first and second output lens systems, 60 and 63, which may make the housing 2 of the optical module 1 compact.

The SMF 9 may be disposed on the axis of the output port 23, which may save an additional mirror that rearranges the optical axis of the second output beam $L_3$ output from the second output port 23 with respect to the axis of the SMF 9; resultantly, may decrease the number of components to be installed within the housing 2.

Also, the optical module 1 may provide the mirror 52 that reflects the continuous beam $L_1$ propagating along the lateral direction of the housing 2 toward the input port 21, the PBS 69 that reflects the first output beam $L_2$ also propagating along the lateral direction and multiplexes thus reflected first output beam $L_2$ with the second output beam $L_3$, and the anti-reflection plate 85 that is disposed facing the minor 52 and the PBS 69 along the longitudinal direction of the housing 2 and prevents the output beams, $L_2$ and $L_3$, that transmit the mirror 52 and the PBS 69 from being reflected at the side wall 2D of the housing 2. The anti-reflection plate 85 may suppress stray beams caused within the housing 2, which suppresses degradation in the performances of the optical module 1. Because only one anti-reflection plate 85 is provided for the continuous beam $L_1$ and the first output beam $L_2$, not provided independent of the respective beams, $L_1$ and $L_2$; the optical module 1 may reduce the number of components installing therein and resultantly the cost thereof.

Also, the step $P_2$ first aligns the dummy fiber 90, then the rear lens 54 by the test beam $TL_1$ provided through the dummy fiber 90. The step $P_5$ optically couples the dummy fiber 92 with the output ports, 22 and 23, first; the front and rear lenses, 62 and 65, are secondly aligned with the output ports, 22 and 23, and finally aligns the dummy fiber 92 with the front and rear lenses, 65 and 62. This alignment procedure may make the process of assembling the optical module 1 simple and efficient.

Also, similar to the present embodiment, the process of assembling the optical module 1 may include steps of $P_6$ to $P_8$ in which one of the front lens, 62 or 65, that shows smaller maximum power for the test beam $TL_2$ with respect to the dummy fiber 92 is first fixed, then the other front lens, 62 or 65, is subsequently fixed. The step $P_8$ may align one of the front lenses, 62 or 65, that shows a greater coupling power along the optical axis thereof such that the coupling power with respect to the dummy fiber 92 becomes substantially equal to, or closer to the smaller maximum power for the dummy fiber 92; then, fixes the one of the front lenses, 62 and 65, thereat. Depending on unbalanced optical losses of the respective waveguides in the semiconductor modulator 13, the output power of the output beams, $L_2$ and $L_3$, output from the output ports, 22 and 23, respectively, is often to be unbalanced. Accordingly, the steps $P_7$ to $P_8$ may balance the power of the output beams, $L_2$ and $L_3$, output from the respective output ports, 22 and 23; and in addition, the power of the output beams, $L_2$ and $L_3$, may be set closer to the respective maxima.

Also, the step $P_8$ may adjust the semiconductor modulator 13 in phase statuses thereof such that the test beams, $TL_2$ and $TL_3$, output from the output ports, 22 and 23, become respective maxima. When the semiconductor modulator 13 in the phase statuses thereof is not controlled, the test beams, $TL_2$ and $TL_3$, are not always set to be respective maxima Such a status sometimes sets the power of the output beams, $L_2$ and $L_3$, output from the output ports, 22 and 23, unbalanced. Adjusting the phase status of the semiconductor modulator 13, the power of the output beams, $L_2$ and $L_3$, may balance.

Second Embodiment

FIG. 13 is a perspective view of an optical module 1A according to the second embodiment of the present invention. The optical module 1A has a feature distinguishable from the optical module 1 of the first embodiment that the three lens systems, 53, 60 and 63, that optically couples the input port 21 of the semiconductor modulator 13 with the input assembly 3 and the output ports, 22 and 23, with the output assembly 4 are replaced to an arrayed lens 60A that integrates three lens elements. FIG. 14 is a front view that illustrates a positional relation between the arrayed lens 60A and the semiconductor modulator 13, in particular, the side 20a thereof providing the input port 21 and the output ports, 22 and 23. Because six lenses in the two lens systems, 53, 60, and 63, are replaced to one arrayed lens 60A, the optical module 1A may further decrease the number of components installed within the housing 2.

A process of assembling the arrayed lens 60A, in particular, procedures to optically align the arrayed lens 60A with the respective ports, 21 to 23, in the semiconductor modulator 13 will be described. The arrayed lens 60A provides three lens elements each having optical axes with spans to neighbor lens element substantially equal to a span between the input port 21 and the output ports, 22 and 23. Also, because the arrayed lens 60A integrally provides three lens elements, once aligned status between one lens element and one port in the semiconductor modulator 13 is possibly miss-aligned during the optical alignment for the rest lens elements.

The alignment process for the arrayed lens 60A according to the present embodiment, accordingly, carries out the alignment for the lens elements disposed outer sides thereof but no alignment is done for the rest lens element disposed in the center. The lens element in the center is automatically positioned by aligning the lens elements provided in the outer sides. Specifically, entering a test beam into the output port 22 through one of the lens element provided in the outer sides and detecting thus entered test beam by electrodes inherently accompanied with the arm waveguides in the semiconductor modulator 13. Although the electrodes in the arm waveguides are provided for generating signal beams, $L_2$ and $L_3$, each modulated by the modulation signals, the process of assembling the arrayed lens 60A uses those electrodes for detecting power of the test beam entering from the output ports, 22 and 23. Adjusting the position of the arrayed lens 60A in directions parallel to the optical axis of the output port 22 and within a plane perpendicular to the optical axis thereof, the assembling process determines and memorizes the position of the arrayed lens 60A for the one of the output port 22. Thereafter, the alignment process carries out similar procedures for another lens element oppositely arranged with respect to a center of the arrayed lens 60A and the other output port 23. Then, the process determines and memorizes the position of the arrayed lens 60A. However, during the latter alignment, the position of the former lens element is possibly and inevitably deviated from the aligned position. Accordingly, the alignment process may calculate the position of the arrayed lens 60A from two sets of the positions each determined in the first and second aligning process and memorized in the system. The position of the center lens element may be automatically determined to the calculated position.

While particular embodiments of the optical module and the process of assembling the optical module according to the present invention have been described herein for purposes of illustration, many modifications and changes will become apparent to those skilled in the art. For instance, the embodiment disposes the optical axis of the SMF aligned with the optical axis of the second output port 23, but the former optical axis may be shifted from the optical axis of the output port 23. Accordingly, the appended claims are intended to encompass all such modifications and changes as fall within the true spirit and scope of this invention.

The invention claimed is:

1. An optical module, comprising:
    a semiconductor modulator having a rectangular plane shape that provides an input port, first and second output ports and two monitor ports, where the semiconductor modulator receives a continuous beam in the input port, splits the continuous beam into split beams, modulates the split beams in phases thereof to generate beams, and combines a part of the beams to generate a first output beam output from the first output port and a rest of the beams to generate a second output beam output from the second output port, the monitor ports each outputting monitor beams split from the first and second output beams, respectively;
    an input lens system and first and second output lens system, the input lens system facing the input port, the first and second output lens systems facing the first and second output ports; and
    wherein the semiconductor modulator provides one side in the rectangular plane shape, the first and second output ports being disposed symmetrical with respect to the input port in the one side, the two monitor ports being disposed in respective outer sides of the first and second output ports and arranged on outer most sides of the one side of the semiconductor modulator, and symmetrical with respect to the input port in the one side, and
    wherein the first and second output ports, the input port and the two monitor ports being arranged with the one side of the semiconductor modulator.

2. The optical module according to claim 1,
    wherein the input lens system and first and second output lens system each including a rear lens and a front lens.

3. The optical module according to claim 1, further including two monitor photodiodes (PDs) each facing the monitor ports of the semiconductor modulator.

4. The optical module according to claim 1,
    further including a housing that provides side walls for enclosing the semiconductor modulator and two monitor PDs therein, and input and output assemblies each provided in an outer side of one of the side walls facing the one side of the semiconductor modulator,
    wherein the output assembly in an optical axis thereof aligned with an optical axis of the second output port of the semiconductor modulator.

5. The optical module according to claim 1,
    wherein the input assembly provides the continuous beam, and the output assembly outputs the first output beam multiplexed with the second output beam,
    wherein the optical module further provides an optical coupling system that optically couples the input assembly with the input port of the semiconductor modulator, and another optical coupling system that optically couples the first and second output ports of the semiconductor modulator with the output assembly, the optical coupling system includes the input lens system and two mirrors that translates the optical axis of the input assembly with an optical axis of the input port of the semiconductor modulator, the another optical coupling system includes a polarization rotator that rotates a polarization of one of the modulated beams output from one of the first and second output ports by 90° and a polarization beam combiner (PBC) that multiplexes the one of the output beams output from the polarization rotator with another of the output beams output from another of the first and second output ports.

6. The optical module according to claim 5,
    further including an anti-reflection plate that prevents beams advancing along a direction intersecting the optical axes of the input port and the first and second output ports.

7. The optical module according to claim 4,
    further including a driver that drives the semiconductor modulator,
    wherein the housing installs the driver and the semiconductor modulator side by side along a longitudinal direction of the housing without interposing any components therebetween.

8. The optical module according to claim 7,
    wherein the housing further includes a feedthrough in one side wall opposite to the side wall providing the input and output assemblies, the driver being installed in front of the feedthrough without interposing any components.

9. The optical module according to claim 7,
    further including a thermo-electric cooler (TEC) that mounts at least the semiconductor modulator thereon.

10. The optical module according to claim 9,
    wherein the driver is installed within the housing independent of the TEC.

11. The optical module according to claim 1,
    wherein the input lens system and the first and second output lens systems are integrally formed in an arrayed lens having three lens element each facing the input port and the first and second output ports of the semiconductor modulator.

12. The optical module according to claim 4, further comprising terminals provided on the side walls, the terminals being electrically connected to monitor photodiodes via wires.

* * * * *